US011878513B2

(12) United States Patent
Tsuyuki et al.

(10) Patent No.: US 11,878,513 B2
(45) Date of Patent: Jan. 23, 2024

(54) RECORDING DEVICE

(71) Applicant: CANON KABUSHIKI KAISHA, Tokyo (JP)

(72) Inventors: Motomi Tsuyuki, Kanagawa (JP); Yasushi Iijima, Tokyo (JP); Yusuke Imahashi, Kanagawa (JP); Hiroshi Arimizu, Chiba (JP); Arihito Miyakoshi, Tokyo (JP); Yoshinori Itoh, Kanagawa (JP); Hideo Sugimura, Tokyo (JP); Takashi Horiba, Kanagawa (JP); Seiji Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 17/875,209

(22) Filed: Jul. 27, 2022

(65) Prior Publication Data

US 2023/0032186 A1 Feb. 2, 2023

(30) Foreign Application Priority Data

Jul. 29, 2021 (JP) ................................ 2021-123904

(51) Int. Cl.
*B41J 11/00* (2006.01)

(52) U.S. Cl.
CPC ................................ *B41J 11/0022* (2021.01)

(58) Field of Classification Search
CPC ...... B41J 11/0022; B41J 2/01; B41J 2/16588; B41J 2/1714; B41J 29/377; B41J 29/38; B41J 2002/012; B41J 2025/008; B41J 2/16517
See application file for complete search history.

(56) References Cited

U.S. PATENT DOCUMENTS

2016/0257127 A1* 9/2016 Arimizu .................... B41J 2/15

FOREIGN PATENT DOCUMENTS

WO 2017/009722 A1 1/2017

* cited by examiner

*Primary Examiner* — Bradley W Thies
(74) *Attorney, Agent, or Firm* — Canon U.S.A., Inc. I.P. Division

(57) ABSTRACT

A recording device includes a recording head, a conveyance portion that conveys a liquid-ejected medium so that the liquid-ejected medium passes through a position facing the recording head, a supply portion for air, and an air blowing mechanism that is disposed on an upstream side of the recording head in a relative moving direction between the recording head and the liquid-ejected medium, the air blowing mechanism including an air blow-out port for blowing out air from the supply portion toward a gap between the recording head and the liquid-ejected medium. The air blow-out port includes a plurality of slits that are lined up in a direction intersecting the relative moving direction, and the plurality of slits are lined up in the direction intersecting the relative moving direction so that long sides of the adjacent slits have regions facing each other in a direction orthogonal to the long sides.

13 Claims, 21 Drawing Sheets

RECORDING DEVICE

BACKGROUND OF THE INVENTION

Field of the Invention

The present invention relates to a recording device including an air blowing mechanism.

Description of the Related Art

In an inkjet recording device, ink ejected from a recording head may land on a liquid-ejected medium, and moisture evaporating from the landed ink droplets may reach a recording head surface and cause vapor condensation, which may reduce the stability of ejection from the recording head. In addition, there is a concern that condensed moisture droplets may fall on the liquid-ejected medium and deteriorate print quality. WO 2017/009722 discloses that vapor condensation around a recording head is prevented by blowing air on a liquid-ejected medium and into a gap between an inkjet recording device and the recording head during inkjet recording.

In a configuration disclosed in WO 2017/009722, moisture evaporating from ink droplets having landed on a liquid-ejected medium reaches a recording head surface, and, in order to prevent vapor condensation from occurring around the recording head, a fast-flowing high-speed gas is ejected between the recording head and a recording medium. Since the high-speed gas causes turbulence, the gas is intermittently ejected between printing operations and is not sprayed during printing. However, ink droplets start to evaporate immediately after they land on a liquid-ejected medium. For this reason, air between the recording head and an upper portion of the liquid-ejected medium contains a large amount of evaporated moisture immediately after printing, and water vapor immediately reaches the recording head surface. That is, even when a high-speed gas is sprayed after printing instead of during printing, water vapor has already reached the recording head surface, which results in a possibility that vapor condensation will occur in the vicinity of the recording head. When vapor condensation occurs in the vicinity of the recording head, it becomes difficult to stably eject ink, which results in a concern that print quality may deteriorate due to concurrent ejection of condensed moisture.

SUMMARY OF THE INVENTION

An object of the present invention is to provide a technique for making it possible to smooth a wind speed of air blown into a gap between a recording head and a liquid-ejected medium and maintain good print quality.

One embodiment presented in this disclosure is a recording device which includes a recording head that ejects a liquid, a conveyance portion that conveys a liquid-ejected medium on which the liquid is ejected so that the liquid-ejected medium passes through a position facing the recording head, a supply portion for air, and an air blowing mechanism that is disposed on an upstream side of the recording head in a relative moving direction between the recording head and the liquid-ejected medium, the air blowing mechanism comprising an air blow-out port including a plurality of slits that are lined up in a direction intersecting the relative moving direction so that long sides of adjacent slits have regions facing each other in a direction orthogonal to the long sides, and the air blow-out port being configured to blow out air supplied from the supply portion toward a gap between the recording head and the liquid-ejected medium.

According to the present invention, it is possible to smooth a wind speed of air blown into a gap between a recording head and a liquid-ejected medium and maintain good print quality.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Recording System

Figure 1:
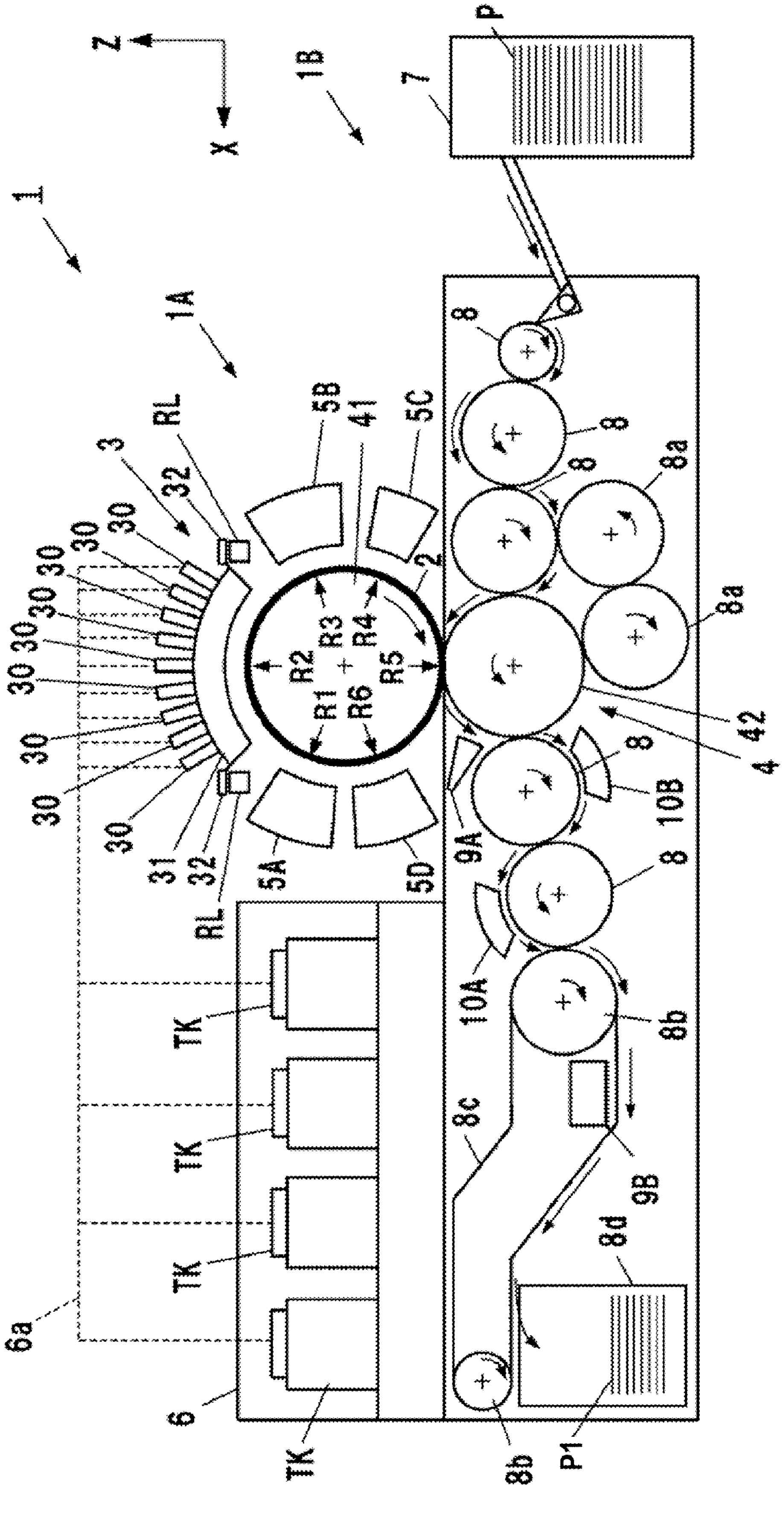
FIG. 1 is an outline diagram of a recording system.

FIG. 1 is a front view schematically illustrating a recording system 1 according to an embodiment of the present invention. The recording system 1 is a sheet type inkjet printer which manufactures a recorded object P1 by transferring an ink image to a recording medium P through a transfer body 2. The recording system 1 includes a recording device 1A and a conveying device 1B. In the present embodiment, an X direction, a Y direction, and a Z direction indicate a width direction (whole length direction), a depth direction, and a height direction of the recording system 1, respectively. The recording medium P is conveyed in the X direction.

Note that "recording" includes not only the case of forming meaningful information such as characters and figures, but also the case of forming images, shapes, patterns, and the like on a wide range of a recording medium or processing a medium, regardless of meaningfulness or meaninglessness, and it does not matter whether it is manifested so that it can be visually perceived by a person. Further, in the present embodiment, sheet-shaped paper is assumed as a "recording medium", but cloth, a plastic film, or the like may be used.

Components of ink are not particularly limited, but in the present embodiment, it is assumed that a water-based pigment ink containing a pigment, water, and a resin as a coloring material is used.

Recording Device

The recording device 1A includes a recording unit 3, a transfer unit 4, peripheral units 5A to 5D, and a supply unit 6.

Recording Unit

Figure 2:
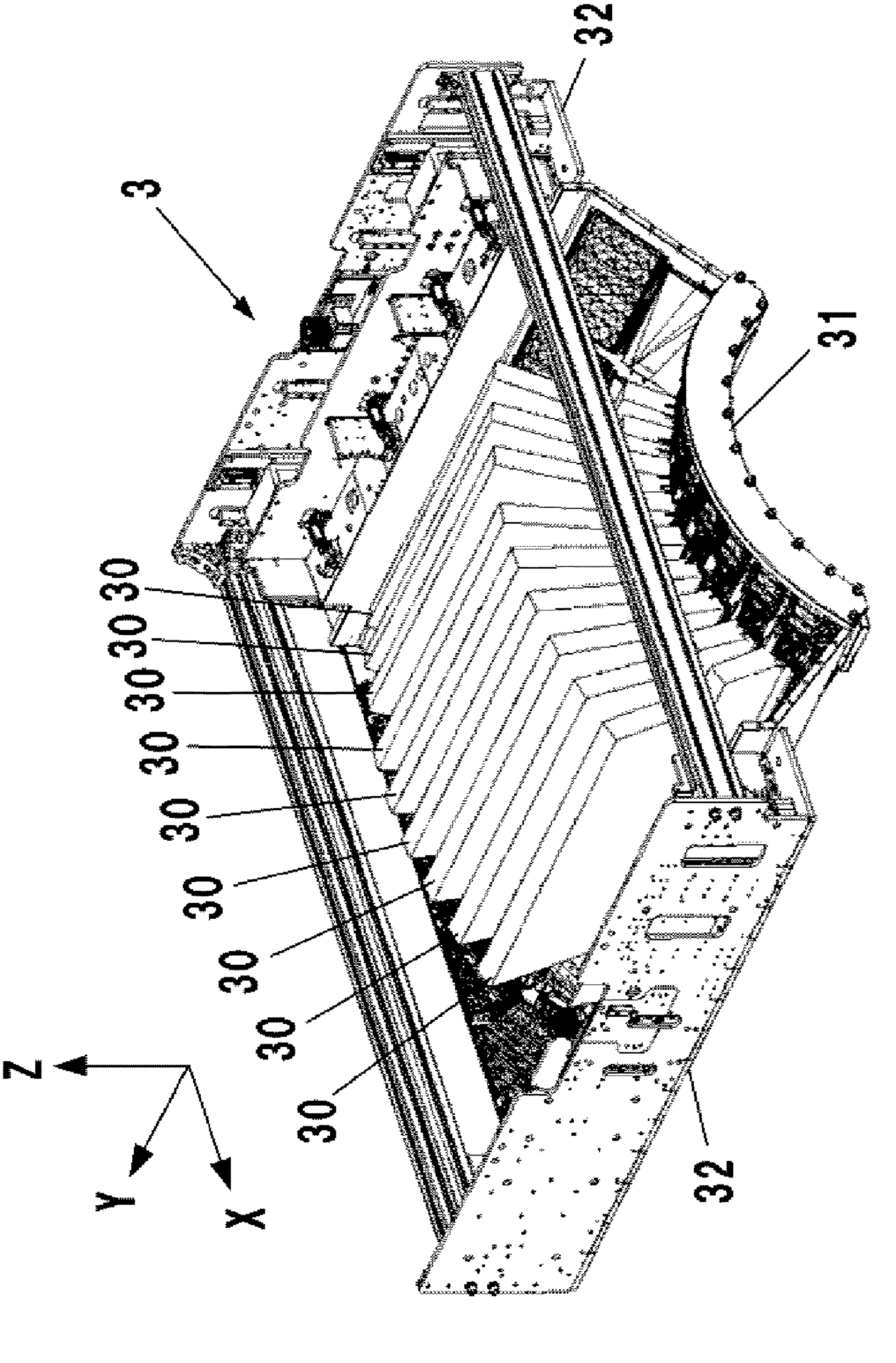
FIG. 2 is a perspective view of a recording unit.

The recording unit 3 will be described with reference to FIGS. 1, 2, and 8. FIG. 2 is a perspective view of the recording unit 3. The recording unit 3 includes a plurality of recording heads 30 and a carriage 31. The recording head 30 ejects liquid ink to the transfer body 2 to form an ink image of a recording image on the transfer body 2.

In the case of the present embodiment, the recording heads 30 are full line recording heads that extend in the Y direction, and nozzles are arranged in a range covering the width of an image recording area of the recording medium having a maximum size that can be used. The recording head 30 has an ink ejection surface through which the nozzle opens on the lower surface thereof, and the ink ejection surface faces the surface of the transfer body 2 via a minute gap (for example, several mm). In the case of the present embodiment, the transfer body 2 is configured to move circularly on a circular orbit, and thus the plurality of recording heads 30 are disposed radially.

Each of the nozzles is provided with an ejection element. The ejection element is, for example, an element that generates pressure in the nozzle and ejects ink in the nozzle, and a technique of a recording head of a known inkjet printer is applicable. Examples of the ejection element include an element that ejects ink by causing film boiling in the ink by an electrothermal converter and forming bubbles, an element that ejects ink by an electromechanical converting body, an element that ejects ink using static electricity, and the like. From the viewpoint of high-speed and high-density recording, an ejection element using an electrothermal converter can be used.

In the case of the present embodiment, nine recording heads 30 are provided. The recording heads 30 eject different types of ink. The different types of ink are, for example, ink having different coloring materials such as yellow ink, magenta ink, cyan ink, and black ink. One recording head 30 ejects one type of ink, and a configuration in which one recording head 30 ejects a plurality of types of ink may be adopted. In a case where a plurality of recording heads 30 are provided in this manner, some of them may eject ink that does not contain a color material (for example, clear ink).

Figure 8:
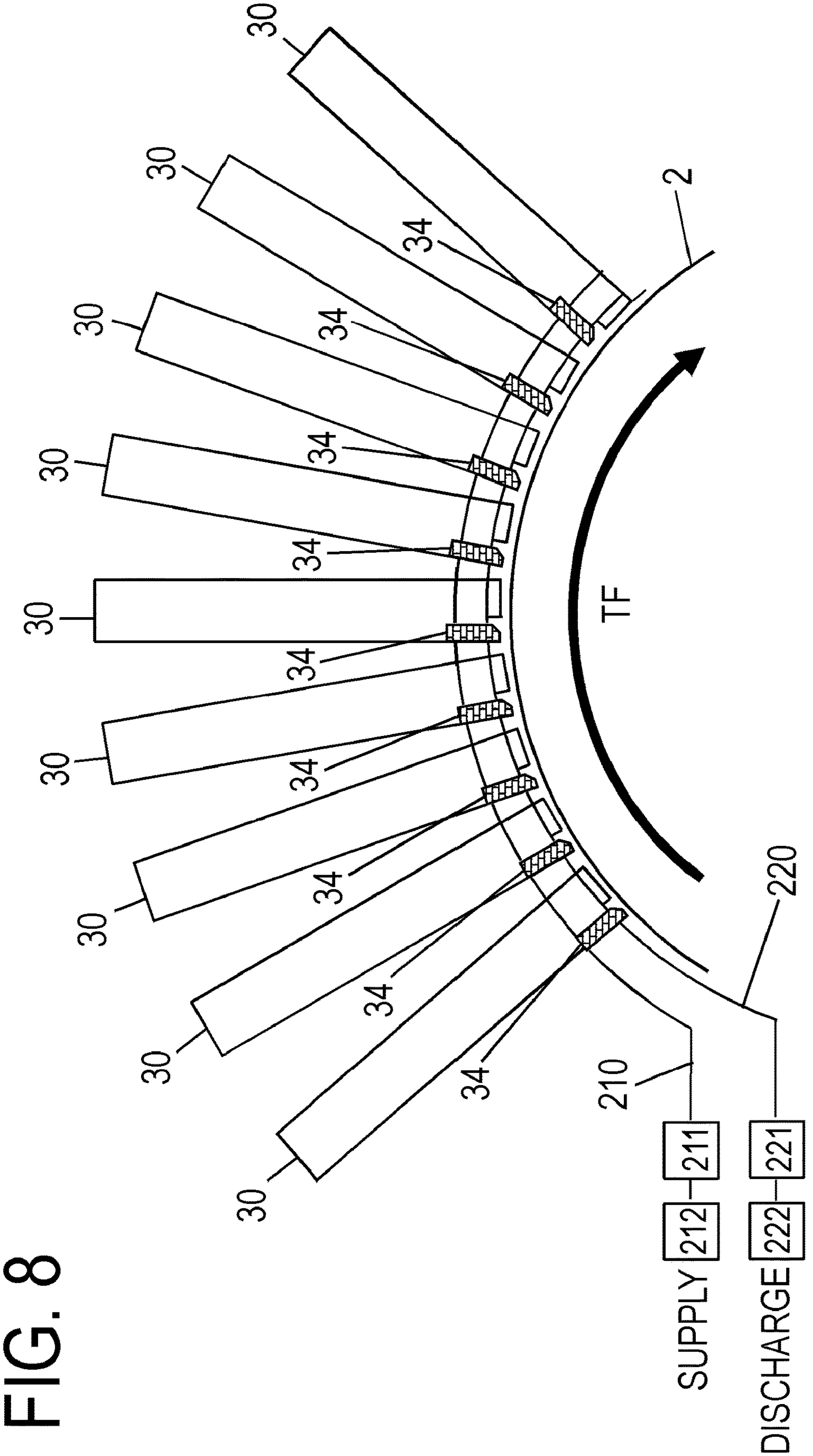
FIG. 8 is a side view illustrating an arrangement relationship between an air blowing mechanism 34 and a recording head 30.

In the case of the present embodiment, as illustrated in FIG. 8, an air blowing mechanism 34 is provided adjacent to the recording head 30 on the upstream side of the recording head in a relative moving direction of the transfer body 2 for each of the nine recording heads 30. In this manner, the recording head 30 and the air blowing mechanism 34 are disposed radially along the outer peripheral surface of the transfer body 2. An air blow-out port 35 is provided for blowing out air into a gap between the surface of the transfer body 2 and the recording head 30, and the air blow-out port 35 is provided inside each of the air blowing mechanisms 34. In addition, in order for the air blow-out port to be open toward the transfer body, the surfaces of some of the air blowing mechanisms 34 constitute the air blow-out port 35 on a surface facing the transfer body 2, and thus air flowing out of the air blow-out port 35 can easily pass through the gap between the surface of the transfer body 2 and the recording head 30. Thereby, air is blown out from the air blow-out port 35 at the time of ejection of ink, and thus it is possible to discharge water vapor between the surface of the transfer body 2 and the recording head 30 from the gap before water vapor evaporating from ink reaches the recording head 30 and to prevent vapor condensation from occurring in the vicinity of the recording head. Thereby, it is possible to stably eject ink and maintain good print quality.

As illustrated in FIGS. 1 and 2 (not illustrated in FIG. 8), the carriage 31 supports the plurality of recording heads 30 and the plurality of air blowing mechanisms 34. In each of the recording heads 30, an end portion on the ink ejection surface side is fixed to the carriage 31. Thereby, it is possible to more accurately maintain the gap between the ink ejection surface and the surface of the transfer body 2. The carriage 31 is configured to be able to be displaced in the Y direction in the drawing while having the recording heads 30 mounted thereon by the guidance of a guide member RL. In the case of the present embodiment, the guide member RL is a rail member that extends in the Y direction, and a pair of guide members RL are provided to be separated from each other in the X direction. A slide portion 32 is provided at each side portion of the carriage 31 in the X direction. The slide portion 32 engages with the guide member RL and slides in the Y direction along the guide member RL.

Figure 3:
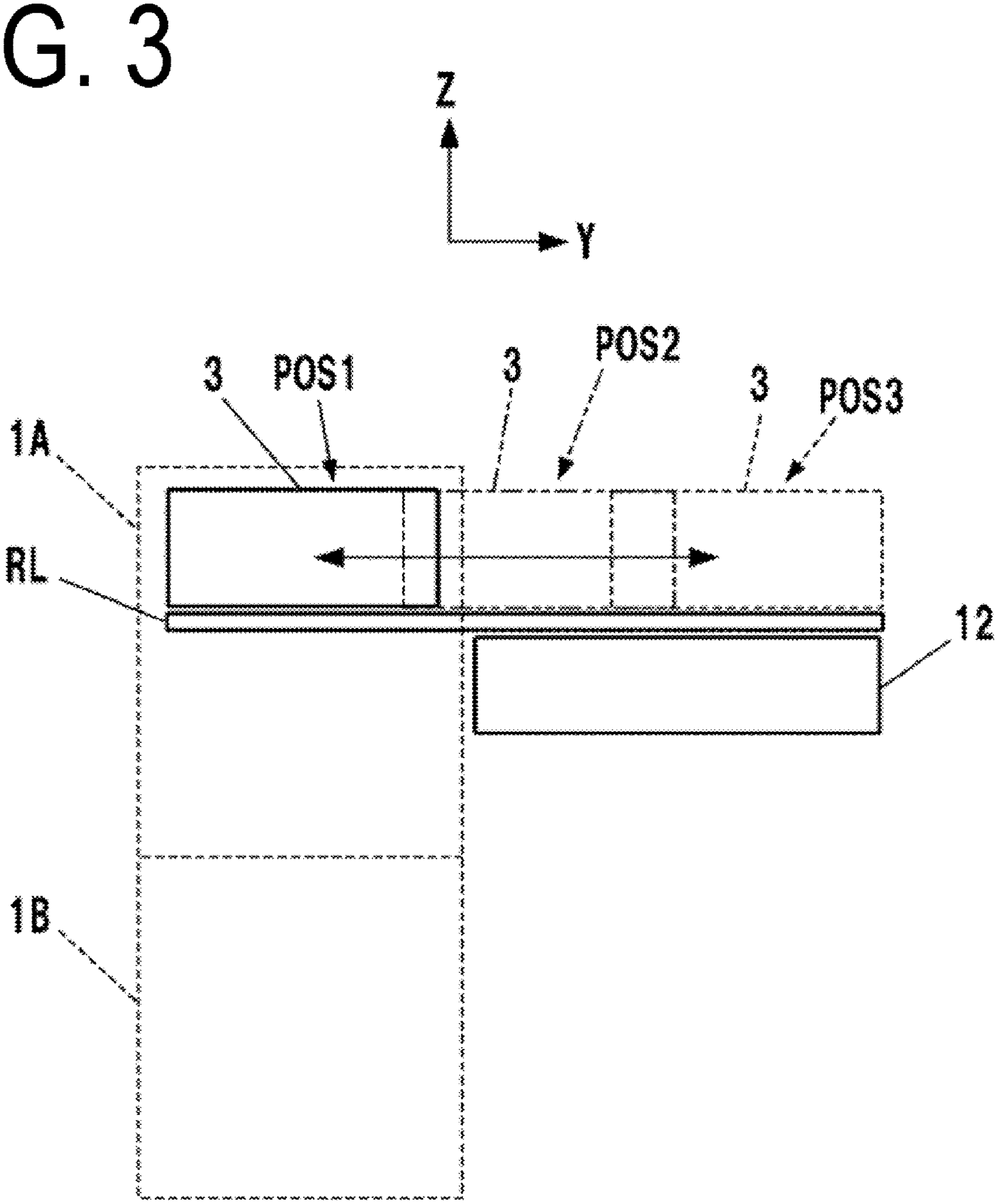
FIG. 3 is a diagram illustrating a displacement mode of the recording unit in FIG. 2.

FIG. 3 is a diagram illustrating a displacement mode of the recording unit 3 and schematically illustrating a right side surface of the recording system 1. A recovery unit 12 is provided at a rear portion of the recording system 1. The recovery unit 12 includes a mechanism that recovers ejection performance of the recording head 30. Examples of such a mechanism can include a cap mechanism that caps the ink ejection surface of the recording head 30, a wiper mechanism that wipes the ink ejection surface, and a suction mechanism that suctions the ink in the recording head 30 from the ink ejection surface under negative pressure.

The guide member RL extends from the side of the transfer body 2 to the recovery unit 12. The recording unit 3 can be displaced between an ejection position POS1 at which the recording unit 3 is indicated by a solid line and a recovery position POS3 at which the recording unit 3 is indicated by a dashed line by the guidance of the guide member RL and is moved by a driving mechanism which is not illustrated in the drawing.

The ejection position POS1 is a position at which the recording unit 3 ejects ink to the transfer body 2 and is a position at which the ink ejection surface of the recording head 30 faces the surface of the transfer body 2. The recovery position POS3 is a position that retracted from the ejection position POS1 and is a position at which the recording unit 3 is positioned on the recovery unit 12. In a case where the recording unit 3 is positioned at the recovery position POS3, the recovery unit 12 can execute recovery processing on the recording head 30. In the case of the present embodiment, the recovery processing can be executed even during the movement of the recording unit 3 before the recording unit 3 reaches the recovery position POS3. A preliminary recovery position POS2 is between the ejection position POS1 and the recovery position POS3. The recovery unit 12 can execute reserve recovery processing on the recording head 30 in the reserve recovery position POS2 while the recording head 30 is moving from the ejection position POS1 to the recovery position POS3.

Transfer Unit

The transfer unit 4 (transfer mechanism) will be described with reference to FIG. 1. The transfer unit 4 includes a transfer drum (transfer cylinder) 41 and an impression cylinder 42 as a pressing member. These cylinders (drums) are rotating bodies that rotate around a rotation shaft in the Y direction and have a cylindrical outer peripheral surface. In FIG. 1, arrows illustrated in the figures of the transfer drum 41 and the impression cylinder 42 indicate the rotation directions thereof, with the transfer drum 41 rotating clockwise, and the impression cylinder 42 rotating counterclockwise.

The transfer drum 41 is a support body that supports the transfer body 2 on the outer peripheral surface thereof. The transfer body 2 is continuously or intermittently provided on the outer peripheral surface of the transfer drum 41 in the circumferential direction. In a case where the transfer body 2 is continuously provided, the transfer body 2 is formed in an endless band shape. In a case where the transfer body 2 is intermittently provided, the transfer body 2 is formed in a band shape having an end so as to be divided into a plurality of segments, and the segments can be disposed in an arc shape at equal pitches on the outer peripheral surface of the transfer drum 41.

Due to the rotation of the transfer drum 41, the transfer body 2 moves circularly on the circular orbit. Depending on the rotation phase of the transfer drum 41, the positions of the transfer body 2 can be distinguished as being in an ejection preprocessing region R1, an ejection region R2, ejection postprocessing regions R3 and R4, a transfer region R5, and a transfer postprocessing region R6. The transfer body 2 circularly passes through these regions.

The ejection preprocessing region R1 is a region in which preprocessing is performed on the transfer body 2 before ink is ejected by the recording unit 3 and is a region in which processing is performed by the peripheral unit 5A. In the case of the present embodiment, a reaction liquid is applied. The ejection region R2 is a region in which the recording unit 3 ejects ink to the transfer body 2 to form an ink image. The ejection postprocessing regions R3 and R4 are processing regions in which processing is performed on the ink image after ink is ejected, the ejection postprocessing region R3 is a region in which processing is performed by a peripheral unit 5B, and the ejection postprocessing region R4 is a region in which processing is performed by a peripheral unit 5C. The transfer region R5 is a region in which an ink image on the transfer body 2 is transferred to the recording medium P by the transfer unit 4. The transfer postprocessing region R6 is a region in which postprocessing is performed on the transfer body 2 after transfer and is a region in which processing is performed by a peripheral unit 5D.

In the case of the present embodiment, the ejection region R2 is a region having a certain section. The other regions R1, and R3 to R6 have a section narrower than that of the ejection region R2. In comparison to a clock dial, in the case of the present embodiment, the ejection preprocessing region R1 is a position of approximately 10 o'clock, the ejection region R2 is a range from approximately 11 o'clock to 1 o'clock, the ejection postprocessing region R3 is a position of approximately 2 o'clock, and the ejection postprocessing region R4 is a position of approximately 4 o'clock. The transfer region R5 is a position of approximately 6 o'clock, and the transfer postprocessing region R6 is a position of approximately 8 o'clock.

The transfer body 2 may be constituted by a single layer or may be a laminated body having a plurality of layers. In a case where the transfer body 2 is constituted by a plurality of layers, the transfer body 2 may include, for example, three layers, that is, a surface layer, an elastic layer, and a compression layer. The surface layer is an outermost layer having an image formation surface on which an ink image is formed. By providing the compression layer, the compression layer can absorb deformation, disperse the fluctuation with respect to a local pressure fluctuation, and maintain transferability even at the time of high-speed recording. The elastic layer is a layer between the surface layer and the compression layer.

As the material of the surface layer, various materials such as a resin and ceramic can be appropriately used, but a material having a high compression modulus of elasticity can be used in terms of durability and the like. Specifically, examples thereof include an acrylic resin, an acrylic silicone resin, a fluorine-containing resin, a condensate obtained by condensing a hydrolysable organic silicon compound, and the like. The surface layer may be used by being subjected to surface processing in order to improve wettability of a reaction liquid, transferability of an image, and the like. Examples of the surface processing include frame processing, corona processing, plasma processing, polishing processing, roughening processing, active energy ray irradiation processing, ozone processing, surfactant processing, silane coupling processing, and the like. Two or more of these processings may be combined. In addition, any surface shape can also be provided for the surface layer.

Examples of the material of the compression layer include acrylonitrile-butadiene rubber, acrylic rubber, chloroprene rubber, urethane rubber, silicone rubber, and the like. At the time of molding such a rubber material, a predetermined amount of vulcanizing agent, a vulcanization accelerator, and the like may be blended in, and a filler such as a foaming agent, hollow fine particles, or sodium chloride may be further blended in as necessary to prepare a porous rubber material. Thereby, a bubble portion is compressed with a change in volume due to various fluctuations in pressure, and thus deformation in directions other than a compression direction is small, thereby making it possible to obtain more stable transferability and durability. Porous rubber materials include those having a continuous pore structure in which pores are continuous with each other and those having an independent pore structure in which pores are independent, but any of the structures may be used, or these structures may be used in combination.

As the member of the elastic layer, various materials such as a resin and ceramic can be appropriately used. Various elastomer materials and rubber materials can be used in terms of processing characteristics and the like. Specific examples thereof include fluoro silicone rubber, phenyl silicone rubber, fluoro rubber, chloroprene rubber, urethane rubber, nitrile rubber and the like. Further, examples thereof include ethylene propylene rubber, natural rubber, styrene rubber, isoprene rubber, butadiene rubber, ethylene/propylene/butadiene copolymer, nitrile butadiene rubber, and the like. In particular, silicone rubber, fluorosilicone rubber, and phenylsilicone rubber are advantageous in terms of dimensional stability and durability because they have a small compression deformation. In addition, a change in elastic modulus according to a temperature is small, which is also advantageous in terms of transferability.

Various adhesives or a double-sided tape can also be used between the surface layer and the elastic layer and between the elastic layer and the compression layer in order to fix them. In addition, the transfer body 2 may include a reinforcing layer having a high compression modulus of elasticity in order to suppress transverse elongation when mounted on the transfer drum 41 and to maintain stiffness. In addition, woven fabric may be used as the reinforcing layer. The transfer body 2 can be manufactured by arbitrarily combining the layers made of the above-described materials.

The outer peripheral surface of the impression cylinder 42 is pressed against the transfer body 2. At least one grip mechanism for holding the tip end portion of the recording medium P is provided on the outer peripheral surface of the impression cylinder 42. A plurality of grip mechanisms may be provided to be separated from each other in the circumferential direction of the impression cylinder 42. While the recording medium P is conveyed close to the outer peripheral surface of the impression cylinder 42, an ink image on the transfer body 2 is transferred to the recording medium when the recording medium passes through a nip portion (transfer portion) between the impression cylinder 42 and the transfer body 2.

Peripheral Unit

The peripheral units 5A to 5D are disposed around the transfer body 2. In the case of the present embodiment, the peripheral units 5A to 5D are an application unit, an absorption unit, a heating unit, and cleaning unit in this order.

The application unit 5A is a mechanism that applies a reaction liquid onto the transfer body 2 before ink is ejected by the recording unit 3. The reaction liquid is a liquid containing a component that increases the viscosity of ink. Here, an increase in the viscosity of ink means that a coloring material, a resin, or the like constituting ink chemically reacts or physically adsorbs when it comes into contact with a component increasing the viscosity of ink, and thus an increase in the viscosity of ink is observed. This increase in viscosity of ink includes not only a case where an increase in the viscosity of the entire ink is observed, but also a case where a portion of a component constituting the ink such as a coloring material or a resin aggregates to cause a local increase in viscosity.

The component that increases the viscosity of ink is not particularly limited, such as metal ions and polymer flocculants, but a material that causes a pH change of ink and aggregates a coloring material in the ink can be used, and an organic acid can be used. Examples of a reaction liquid application mechanism include a roller, a recording head, a die coating device (die coater), a blade coating device (blade coater), and the like. When a reaction liquid is applied to the transfer body 2 before ink is ejected to the transfer body 2, ink that has reached the transfer body 2 can be immediately fixed. Thereby, it is possible to suppress bleeding in which adjacent inks are mixed with each other.

The absorption unit 5B is a mechanism that absorbs a liquid component from an ink image on the transfer body 2 before transfer. By reducing the liquid component of the ink image, bleeding of the image recorded on the recording medium P can be suppressed. When a reduction in a liquid component is explained from different points of view, it can also be expressed that ink constituting an ink image on the transfer body 2 is concentrated. Concentrating the ink means that the ratio of a solid content such as a coloring material or a resin contained in the ink with respect to a liquid component increases as the liquid component contained in the ink decreases.

The absorption unit 5B includes, for example, a liquid absorbing member that comes into contact with an ink image to reduce the amount of a liquid component of the ink image. The liquid absorbing member may be formed on the outer peripheral surface of a roller, or may be formed in an endless sheet shape and run circularly. In terms of protecting the ink image, the liquid absorbing member may be moved in synchronization with the transfer body 2 by making the moving speed of the liquid absorbing member the same as the peripheral speed of the transfer body 2.

The liquid absorbing member may include a porous body that comes into contact with the ink image. In order to suppress the adhesion of ink solids to the liquid absorbing member, the pore size of the porous body on the surface in contact with the ink image may be 10 μm or less. Here, the pore size indicates an average diameter and can be measured by a known means such as a mercury porosimetry, a nitrogen adsorption method, or SEM image observation. Note that the liquid component is not particularly limited as long as it does not have a fixed shape, has fluidity, and has a substantially fixed volume. Examples of the liquid component include water, an organic solvent, and the like contained in ink or a reaction liquid.

The heating unit 5C is a mechanism that heats an ink image on the transfer body 2 before transfer. By heating the ink image, a resin in the ink image is melted, thereby improving transferability for the recording medium P. A heating temperature can be set to be equal to or higher than a minimum film forming temperature (MFT) of the resin. MFT can be measured by devices conforming to a generally known method, for example, JIS K 6828-2:2003 or ISO2115:1996. From the viewpoint of transferability and image durability, the ink image may be heated at a temperature higher than MFT by 10° C. or higher, and may be further heated at a temperature higher than MFT by 20° C. or higher. As the heating unit 5C, known heating devices such as various lamps using such as infrared rays and a hot air fan can be used. An infrared heater can be used in terms of heating efficiency.

The cleaning unit 5D is a mechanism that cleans the transfer body 2 after transfer. The cleaning unit 5D removes ink remaining on the transfer body 2, dust on the transfer body 2, and the like. For the cleaning unit 5D, for example, a known method such as a method of bringing a porous member into contact with the transfer body 2, a method of rubbing the surface of the transfer body 2 with a brush, a method of scraping the surface of the transfer body 2 with a blade, or the like can be appropriately used. In addition, as a cleaning member used for cleaning, a cleaning member having a known shape such as a roller shape or a web shape can be used.

As described above, in the present embodiment, the application unit 5A, the absorption unit 5B, the heating unit 5C, and the cleaning unit 5D are provided as peripheral units, but a cooling function of the transfer body 2 may be applied to some of these units, or a cooling unit may be added thereto. In the present embodiment, the temperature of the transfer body 2 may rise due to the heat of the heating unit 5C. When an ink image exceeds the boiling point of water, which is a main solvent of ink, after the ink is ejected to the transfer body 2 by the recording unit 3, absorption performance of a liquid component by the absorption unit 5B may deteriorate. By cooling the transfer body 2 so that the ejected ink is maintained at less than the boiling point of water, the absorption performance of the liquid component can be maintained.

The cooling unit may be a mechanism that brings a member (for example, a roller) into contact with the air blowing mechanism 34 that blows air to the transfer body 2, or the transfer body 2 and cools the member by air cooling or water cooling. In addition, the cooling unit may be a mechanism that cools the cleaning member of the cleaning unit 5D. A cooling timing may be a period until a reaction liquid is applied, after transfer.

Supply Unit

The supply unit 6 is a mechanism that supplies ink to the recording heads 30 of the recording unit 3. The supply unit 6 may be provided on a rear portion side of the recording system 1. The supply unit 6 includes a storage portion TK that stores ink for each type of ink. The storage portion TK may be constituted by a main tank and a sub-tank. The storage portions TK and the recording heads 30 communicate with each other through a flow passage 6*a*, and ink is supplied from the storage portions TK to the recording heads 30. The flow passage 6*a* may be a flow passage that circulates ink between the storage portions TK and the recording heads 30, and the supply unit 6 may include a pump that circulates ink, or the like. A degassing mechanism for degassing air bubbles in ink may be provided in the middle of the flow passage 6*a* or in the storage portion TK. A valve for adjusting the liquid pressure of ink and the atmospheric pressure may be provided in the middle of the flow passage 6*a* or in the storage portion TK. The heights of the storage portion TK and the recording head 30 in the Z direction may be designed such that an ink liquid level in the storage portion TK is lower than the ink ejection surface of the recording head 30.

Conveying Device

The conveying device 1B is a device that feeds the recording medium P to the transfer unit 4 and discharges a recorded object P1 having an ink image transferred thereto from the transfer unit 4. The conveying device 1B includes a feeding unit 7, a plurality of conveying cylinders 8 and 8*a*, two sprockets 8*b*, a chain 8*c*, and a collecting unit 8*d*. In FIG. 1, an arrow on the inner side of a figure of each configuration in the conveying device 1B indicates a rotation direction of the configuration, and an arrow on the outside indicates a conveyance path of the recording medium P or the recorded object P1. The recording medium P is conveyed from the feeding unit 7 to the transfer unit 4, and the recorded object P1 (a recording medium having an image recorded thereon) is conveyed from the transfer unit 4 to the collecting unit 8*d*. The feeding unit 7 side may be referred to as an upstream side in a conveying direction, and the collecting unit 8*d* side may be referred to as a downstream side.

The feeding unit 7 includes a loading portion on which a plurality of recording media P are loaded, and also includes a feeding mechanism for feeding the recording media P one by one from the loading portion to the conveying cylinder 8 on the most upstream side. The conveying cylinders 8 and 8*a* are rotating bodies that rotate around a rotation shaft in the Y direction and have a cylindrical outer peripheral surface. At least one grip mechanism that holds a tip end portion of the recording medium P (or the recorded object P1) is provided on the outer peripheral surface of each of the conveying cylinders 8 and 8*a*. Holding operations and release operations of the grip mechanisms are controlled such that the recording medium P is delivered between adjacent conveying cylinders.

The two conveying cylinders 8*a* are conveying cylinders for reversing the recording medium P. In a case where recording is performed on both sides of the recording medium P, the recording medium P is delivered to the conveying cylinder 8*a* without being delivered from the impression cylinder 42 to the conveying cylinder 8 adjacent to the downstream side after being delivered to a front surface (first surface). The front and back of the recording medium P are reversed through the two conveying cylinders 8*a*, and the recording medium P is delivered to the impression cylinder 42 again through the conveying cylinder 8 on the upstream side of the impression cylinder 42. Thereby, the back surface of the recording medium P faces the transfer drum 41, and an ink image is transferred to the back surface (second surface).

The chain 8*c* is wound between two sprockets 8*b*. One of the two sprockets 8*b* is a driving sprocket, and the other one is a driven sprocket. The chain 8*c* runs circularly by the rotation of the driving sprocket. The chain 8*c* is provided with a plurality of grip mechanisms that are separated from each other in the longitudinal direction. The grip mechanisms grip the end portion of the recorded object P1. The recorded object P1 is delivered from the conveying cylinder 8 positioned at a downstream end to the grip mechanisms of the chain 8*c*, and the recorded object P1 gripped by the grip mechanisms is conveyed to the collecting unit 8*d* by the running of the chain 8*c*, so that gripping is released. Thereby, the recorded object P1 is loaded in the collecting unit 8*d*.

Post Processing Unit

The conveying device 1B is provided with postprocessing units 10A and 10B. The postprocessing units 10A and 10B are mechanisms that are disposed on a downstream side of the transfer unit 4 and perform postprocessing on the recorded object P1. The postprocessing unit 10A performs processing on the front surface (first surface) of the recorded object P1, and the postprocessing unit 10B performs processing on the back surface (second surface) of the recorded object P1. Examples of processing contents include coating on the image recording surface of the recorded object P1 for the purpose of performing protection, polishing, and the like on an image. Examples of coating contents include liquid application, sheet welding, laminating, and the like.

Inspection Unit

The conveying device 1B is provided with inspection units 9A and 9B. The inspection units 9A and 9B are mechanisms that are disposed on a downstream side of the transfer unit 4 and perform inspection of the recorded object P1.

In the case of the present embodiment, the inspection unit 9A is an imaging device that captures an image recorded on the recorded object P1 and includes an imaging element such as a CCD sensor or a CMOS sensor. The inspection unit 9A captures a recording image during a recording operation which is continuously performed. It is possible to confirm changes in the color tone of a recording image over time based on the image captured by the inspection unit 9A and to determine whether or not image data or recording data can be corrected. In the case of the present embodiment, the inspection unit 9A is disposed so as to be capable of partially capturing a recording image immediately after transfer because an imaging range is set on the outer peripheral surface of the impression cylinder 42. The inspection unit 9A may inspect all recording images or may perform inspection for every predetermined number of recording images.

In the case of the present embodiment, the inspection unit 9B is also an imaging device that captures an image recorded on the recorded object P1 and includes an imaging element such as a CCD sensor or a CMOS sensor. The inspection unit 9B captures a recording image in a test recording operation. The inspection unit 9B captures the entire recording image, and it is possible to perform basic setting of various corrections related to recording data based on the image captured by the inspection unit 9B. In the case of the present embodiment, the inspection unit 9B is disposed at a position where the recorded object P1 conveyed by the chain 8*c* is imaged. In a case where a recording image is captured by the inspection unit 9B, the inspection unit 9B captures the entire image by temporarily stopping the running of the chain 8*c*. The inspection unit 9B may be a scanner that scans the upper portion of the recorded object P1.

Control Unit

Figure 4:
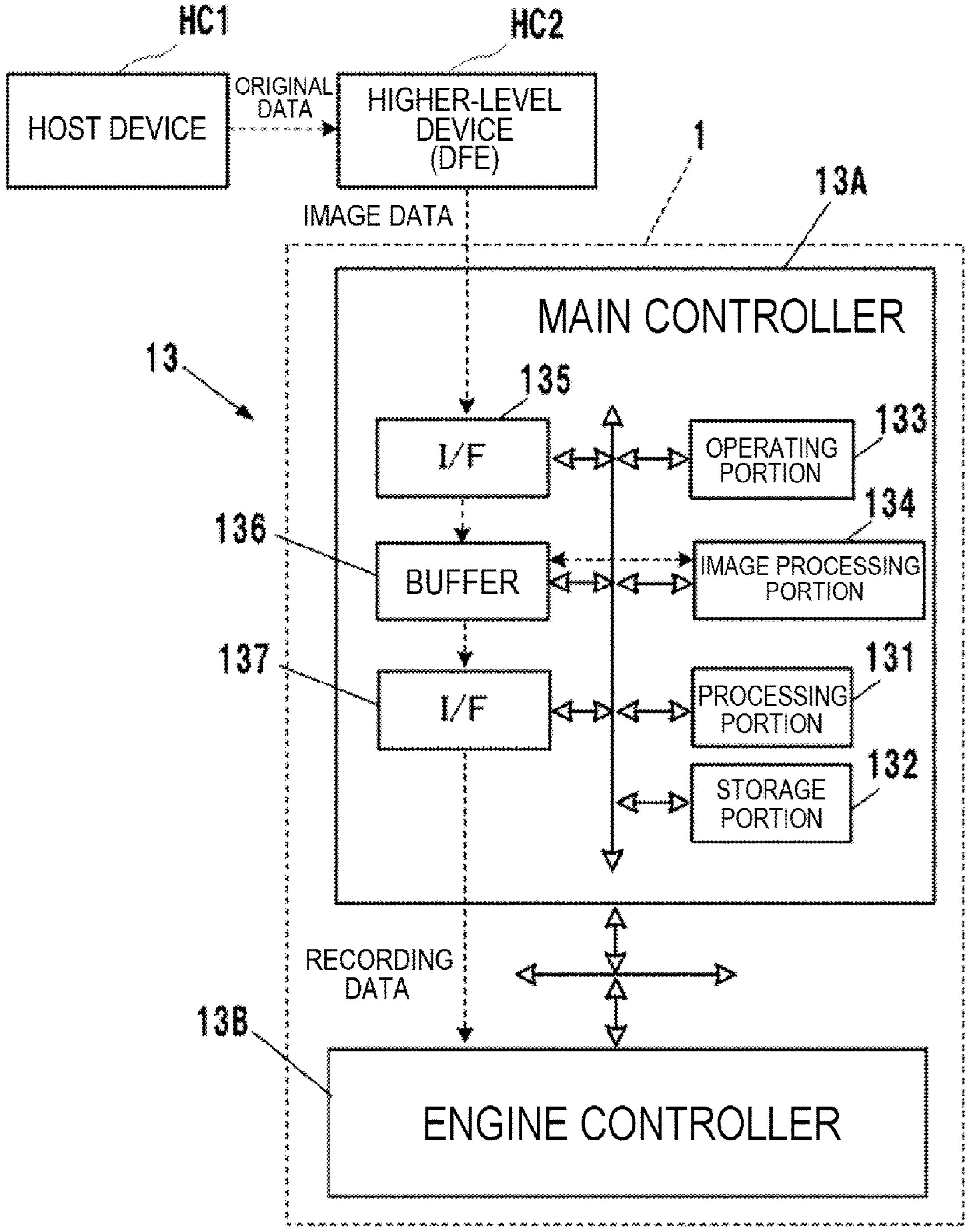
FIG. 4 is a block diagram of a control system of the recording system in FIG. 1.
Figure 5:
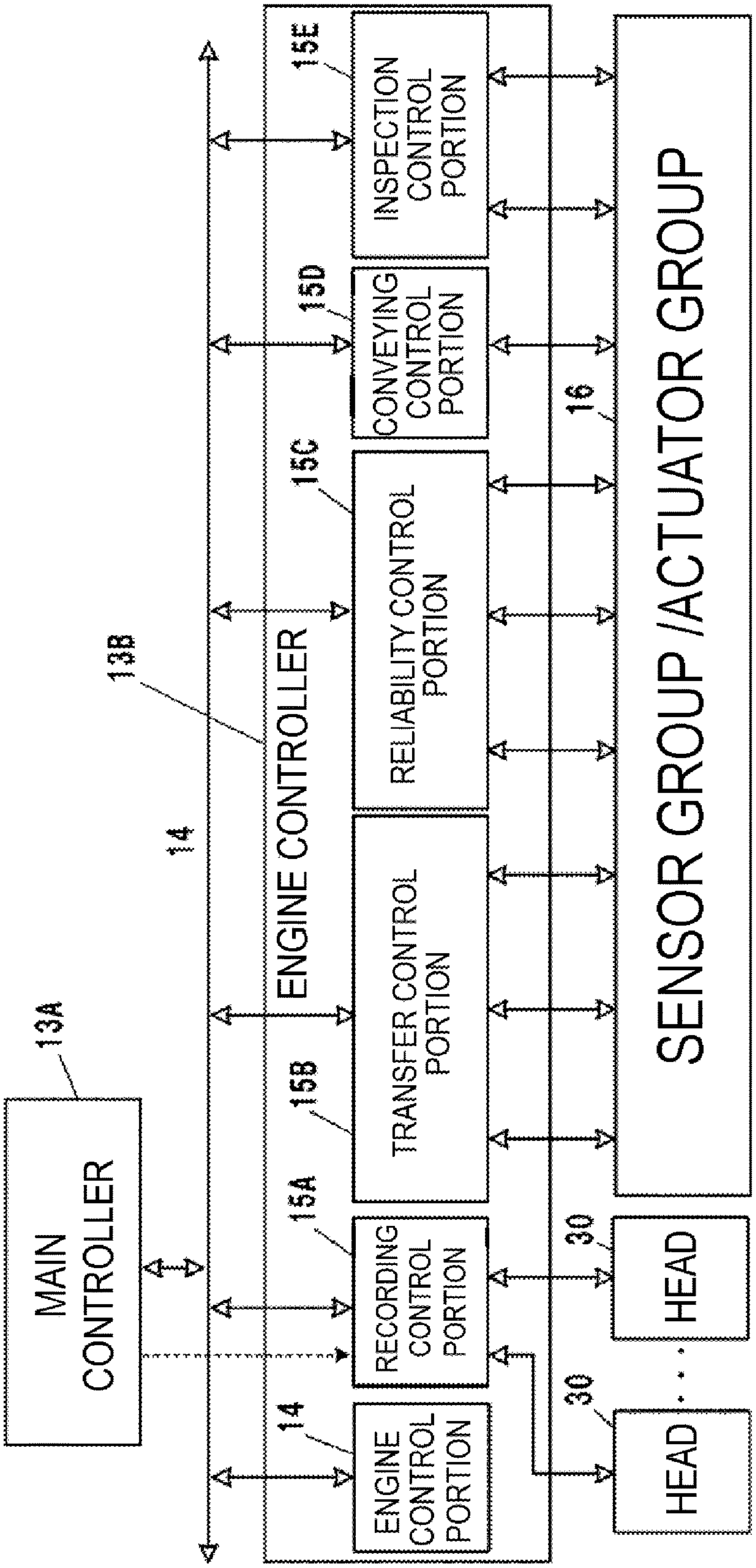
FIG. 5 is a block diagram of a control system of the recording system in FIG. 1.

Next, a control unit of the recording system 1 will be described. FIGS. 4 and 5 are block diagrams of a control unit 13 of the recording system 1. The control unit 13 is communicatively connected to a high-level device (DFE) HC2, and the high-level device HC2 is communicatively connected to a host device HC1.

In the host device HC1, original data which is the source of a recording image is generated or stored. The original data mentioned here is generated in a format of an electronic file such as a document file or an image file. The original data is transmitted to the high-level device HC2, and the high-level device HC2 converts the received original data into a data format (for example, RGB data that represents an image in RGB colors) which is usable in the control unit 13. The converted data is transmitted from the high-level device HC2 to the control unit 13 as image data, and the control unit 13 starts a recording operation based on the received image data.

In the case of the present embodiment, the control unit 13 is roughly divided into a main controller 13A and an engine controller 13B. The main controller 13A includes a processing portion 131, a storage portion 132, an operation portion 133, an image processing portion 134, a communication I/F (interface) 135, a buffer 136, and a communication I/F 137.

The processing portion 131, which is a processor such as a CPU, executes programs stored in the storage portion 132 and controls the entire main controller 13A. The storage portion 132, which is a storage device such as a RAM, a ROM, a hard disk, or an SSD, stores programs executed by the processing portion 131 and data and provides a work area to the processing portion 131. The operation portion 133, which is an input device such as a touch panel, a keyboard, or a mouse, receives a user's instruction.

The image processing portion 134 is an electronic circuit that includes, for example, an image processing processor. The buffer 136 is, for example, a RAM, a hard disk, or an SSD. The communication I/F 135 communicates with the high-level device HC2, and the communication I/F 137 communicates with the engine controller 13B. In FIG. 4, a dashed arrow indicates a flow of processing of image data. Image data received from the high-level device HC2 through the communication IF 135 is accumulated in the buffer 136. The image processing portion 134 reads the image data from the buffer 136, performs predetermined image processing on the read image data, and stores the processed image data in the buffer 136 again. The image data after the image processing which is stored in the buffer 136 is transmitted from the communication I/F 137 to the engine controller 13B as recording data used by a print engine.

As illustrated in FIG. 5, the engine controller 13B includes various control portions 14, and 15A to 15E, and acquires detection results of a sensor group and an actuator group 16 that are included in the recording system 1 and performs driving control. These control portions include a processor such as a CPU, a storage device such as a RAM or a ROM, and an interface with an external device. Note that the division of the control portions is an example, and some control operations may be executed by a plurality of control portions that are further subdivided, or conversely, a plurality of control portions may be integrated, and the control contents thereof may be processed by one control portion.

The engine control portion 14 controls the entire engine controller 13B. The recording control portion 15A converts the recorded data received from the main controller 13A into a data format, such as of raster data, which is suitable for driving of the recording heads 30. The recording control portion 15A controls the ejection of the recording heads 30.

The transfer control portion 15B controls the application unit 5A, controls the absorption unit 5B, controls the heating unit 5C, and controls the cleaning unit 5D.

The reliability control portion 15C controls the supply unit 6, controls the recovery unit 12, and controls a driving mechanism for moving the recording unit 3 between the ejection position POS1 and the recovery position POS3.

The conveyance control portion 15D controls the conveying device 1B. The inspection control portion 15E controls the inspection unit 9B and controls the inspection unit 9A.

The sensor group out of the sensor group and the actuator group 16 includes a sensor that detects the position and speed of a movable portion, a sensor that detects a temperature, an imaging element, and the like. The actuator group includes a motor, an electromagnetic solenoid, an electromagnetic valve, and the like.

Operation Example

Figure 6:
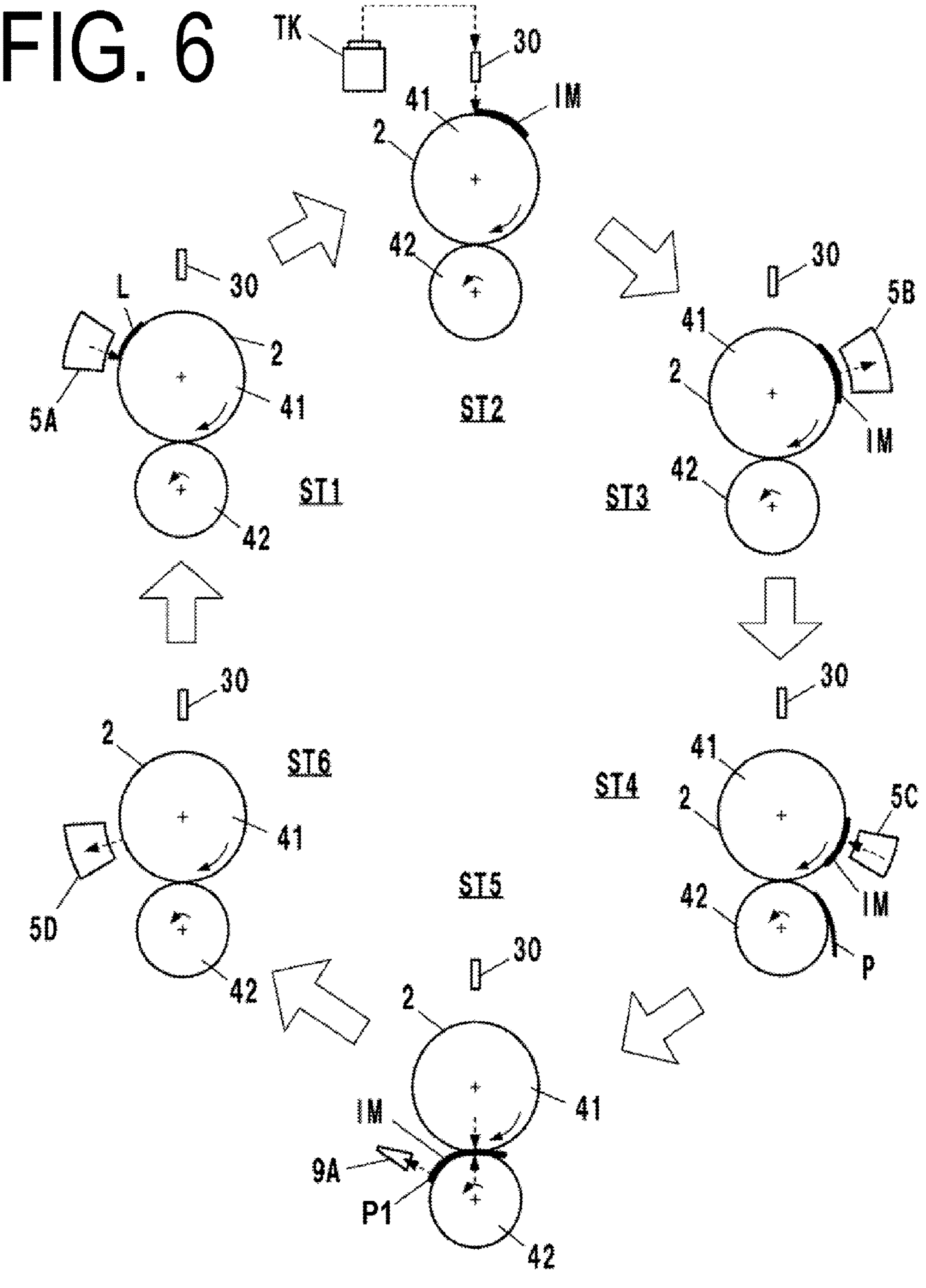
FIG. 6 is a diagram illustrating an operation example of the recording system in FIG. 1.

FIG. 6 is a diagram schematically illustrating an example of a recording operation. The following steps are performed circularly while the transfer drum 41 and the impression cylinder 42 rotate. As shown in a state ST1, a reaction liquid L is first applied onto the transfer body 2 from the application unit 5A. A part where the reaction liquid L is applied onto the transfer body 2 is moved in association with the rotation of the transfer drum 41. When the part where the reaction liquid L has been applied reaches below the recording head 30, ink is ejected from the recording head 30 to the transfer body 2 as shown in a state ST2. Thereby, an ink image IM is formed. At this time, the ejected ink is mixed with the reaction liquid L on the transfer body 2, and thus the aggregation of a coloring material is promoted. The ejected ink is supplied from the storage portion TK of the supply unit 6 to the recording head 30.

The ink image IM on the transfer body 2 is moved in association with the rotation of the transfer body 2. When the ink image IM reaches the absorption unit 5B, a liquid component is absorbed from the ink image IM by the absorption unit 5B as shown in a state ST3. When the ink image IM reaches the heating unit 5C, the ink image IM is heated by the heating unit 5C as shown in a state ST4, a resin in the ink image IM is melted, and the ink image IM is formed as a film. In synchronization with the formation of such an ink image IM, the recording medium P is conveyed by the conveying device 1B.

As shown in a state ST5, the ink image IM and the recording medium P reach a nip portion between the transfer body 2 and the impression cylinder 42, and the ink image IM is transferred to the recording medium P, thereby manufacturing the recorded object P1. When the ink image IM and the recording medium P pass through the nip portion, an image recorded on the recorded object P1 is captured by the inspection unit 9A, and a recording image is inspected. The recorded object P1 is conveyed to the collecting unit **8*d* by the conveying device 1**B.

When a portion where the ink image IM is formed on the transfer body 2 reaches the cleaning unit 5D, the portion is cleaned by the cleaning unit 5D as shown in a state ST6. After the cleaning, the transfer body 2 is rotated once, and an ink image is repeatedly transferred to the recording medium P in a similar procedure. In the above description, for easy understanding, the ink image IM is transferred to one recording medium P once by one rotation of the transfer body 2, but the ink image IM can be continuously transferred to a plurality of recording media P by one rotation of the transfer body 2.

Figure 7:
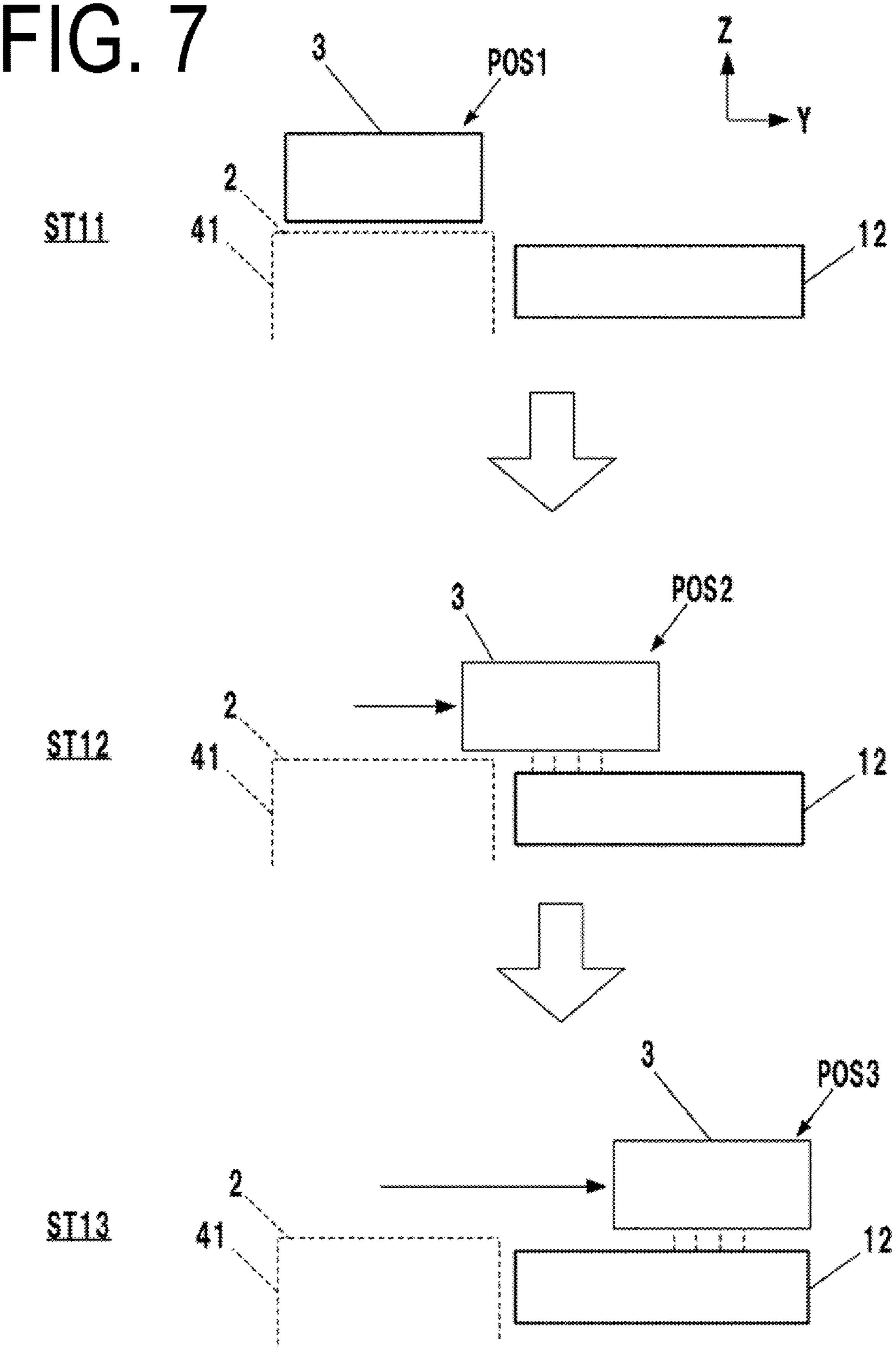
FIG. 7 is a diagram illustrating an operation example of the recording system in FIG. 1.

When such a recording operation is continued, maintenance of the recording heads 30 is required. FIG. 7 illustrates an operation example during maintenance of the recording heads 30. A state ST11 shows a state where the recording unit 3 is positioned at the ejection position POS1. A state ST12 shows a state where the recording unit 3 passes through the reserve recovery position POS2, and the recovery unit 12 executes processing for recovering the ejection performance of the recording heads 30 of the recording unit 3 during the passage. Thereafter, as shown in a state ST13, the recovery unit 12 executes processing for recovering the ejection performance of the recording heads 30 in a state where the recording unit 3 is positioned at the recovery position POS3.

Other Embodiments

The transfer type recording device that records an image on the recording medium P by forming an ink image on the transfer body 2 provided on the outer peripheral surface of the transfer drum 41 and transferring the ink image to the recording medium P has been described above. However, the present invention is not limited thereto, and a direct drawing type recording device that directly records an image by ejecting ink from the recording heads 30 onto the conveyed recording medium P may be used. Although a configuration in which the recording unit 3 includes the plurality of recording heads 30 has been described above, the recording unit 3 may be configured to include one recording head 30. In addition, the recording head 30 may not be a full line head and may be a serial type recording head that ejects ink from the recording head 30 to form an ink image while moving a carriage having the recording head 30 detachably and attachably mounted thereon in the Y direction.

A conveying mechanism for the recording medium P may be configured in other manners such as a manner in which the recording medium P is pinched by a roller pair and conveyed. In a manner in which the recording medium P is conveyed by the roller pair, or the like, a rolled sheet may be used as the recording medium P, and the recorded object P1 may be manufactured by cutting the rolled sheet after transfer.

In the above-described embodiment, the transfer body 2 is provided on the outer peripheral surface of the transfer drum 41, but the transfer body 2 may be configured in other manners such as a manner in which the transfer body 2 is formed in an endless shape and runs circularly.

In addition, the present invention can also be implemented through processing in which a program for realizing one or more functions in the above-described embodiment is supplied to a system or a device through a network or a storage medium, and one or more processors in a computer of the system or the device read and execute the program. In addition, the present invention can also be implemented by a circuit (for example, an ASIC) which realizes one or more functions.

Problems of Air Blowing Mechanism in Related Art

Figure 18:
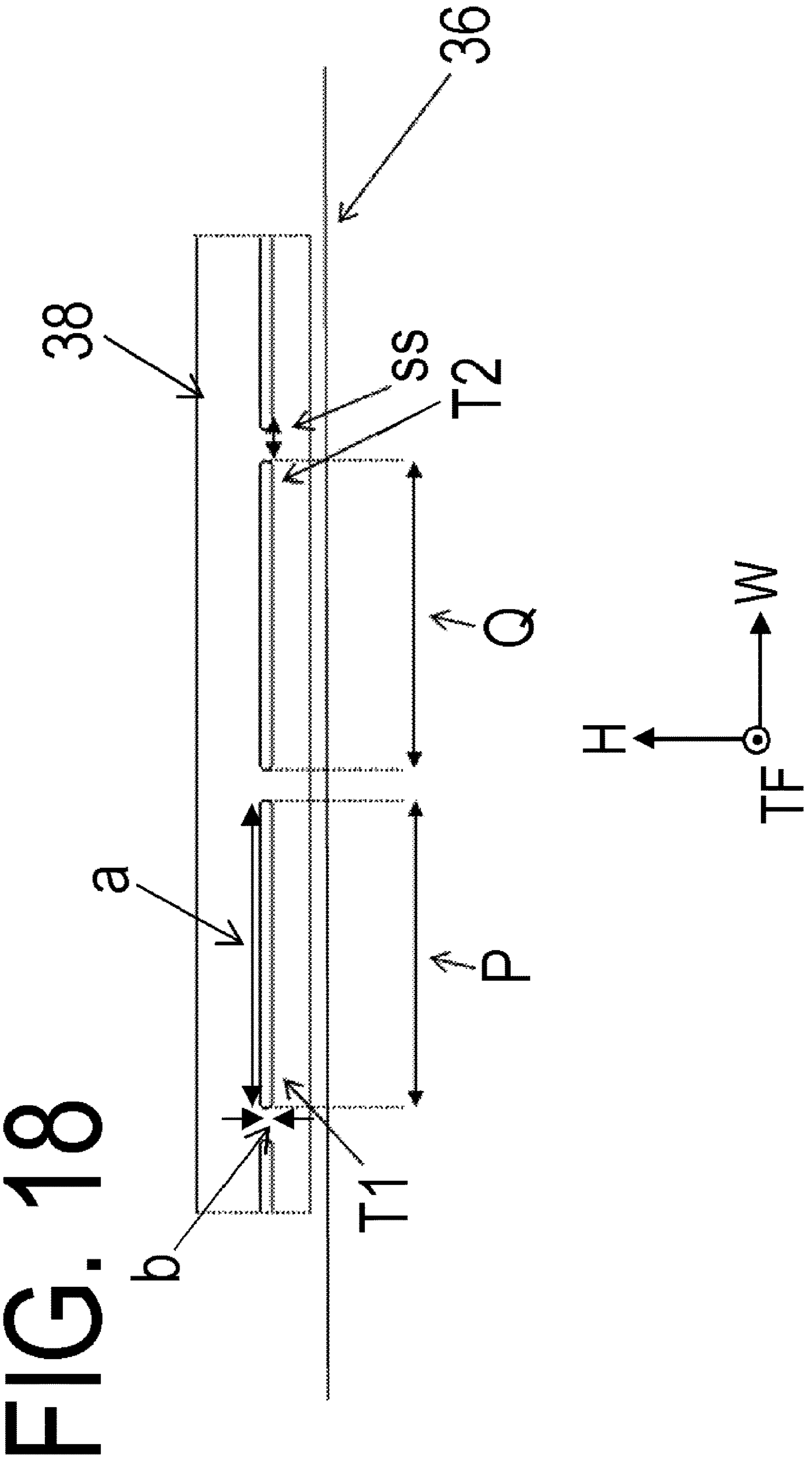
FIG. 18 is a partially enlarged view of the air blow-out port surface.

In a recording head of a full line inkjet recording device, in a case where air is actively blown from an air blow-out port of an air blowing mechanism to a gap between a recording head and a liquid-ejected medium when ink is ejected from the recording head, it is desirable that the wind speed of the blown air is smoothed under an ejection surface and passes at an appropriate speed. In order to smooth the wind speed of air blown into the gap between the recording head and the liquid-ejected medium, an opening that is elongated in a longitudinal direction is easily conceivable as the air blow-out port of the air blowing mechanism. However, in the case of the full line recording head, an elongated slit having an opening in a longitudinal direction is formed, which leads to a problem that it is technically difficult to manufacture the full line recording head. In addition, even when an elongated opening can be manufactured, the strength of the surface of the air blowing mechanism that is open is weakened, and thus the accuracy of the surface cannot be maintained, thereby making it difficult to stably blow out air. In a case where the elongated opening is avoided and the long side of the slit is divided short as illustrated in FIG. 18, the wind velocities of air between adjacent openings do not overlap each other in a gap between the recording head and the liquid-ejected medium in air blown out from the air blowing mechanism, and thus the wind speed of air blown in under the recording head is not smoothed.

Features of Air Blowing Mechanism in the Present Example

By using the air blowing mechanism according to the example of the present invention, the wind speed of air blown into a gap between the recording head and the liquid-ejected medium can be smoothed. When air is blown into the gap between the recording head and the liquid-ejected medium, ink droplets are slightly affected, thereby causing a distortion. However, in the configuration of the present example, the wind speed of blown air is smoothed, and thus a distortion occurs uniformly in the entire region in the longitudinal direction, and consequently, print quality does not deteriorate. In addition, when the blown air passes through the gap between the recording head and the liquid-ejected medium at the time of ejection, it is possible to discharge water vapor evaporating from landed ink droplets from between the surface of the recorded medium and the recording head before the ink droplets reach the recording head and to prevent vapor condensation from occurring in the vicinity of the recording head. In addition, vapor condensation in the vicinity of the recording head is suppressed, and thus it is possible to prevent the liquid-ejected medium from being contaminated due to vapor condensation becoming droplets and the droplets falling on the liquid-ejected medium. Thus, when the air blowing mechanism according to the present example is used, it is possible to provide an inkjet recording device capable of maintaining good print quality.

Hereinafter, a detailed structure of the air blowing mechanism 34 according to the example of the present invention will be described.

Example 1

Figure 10:
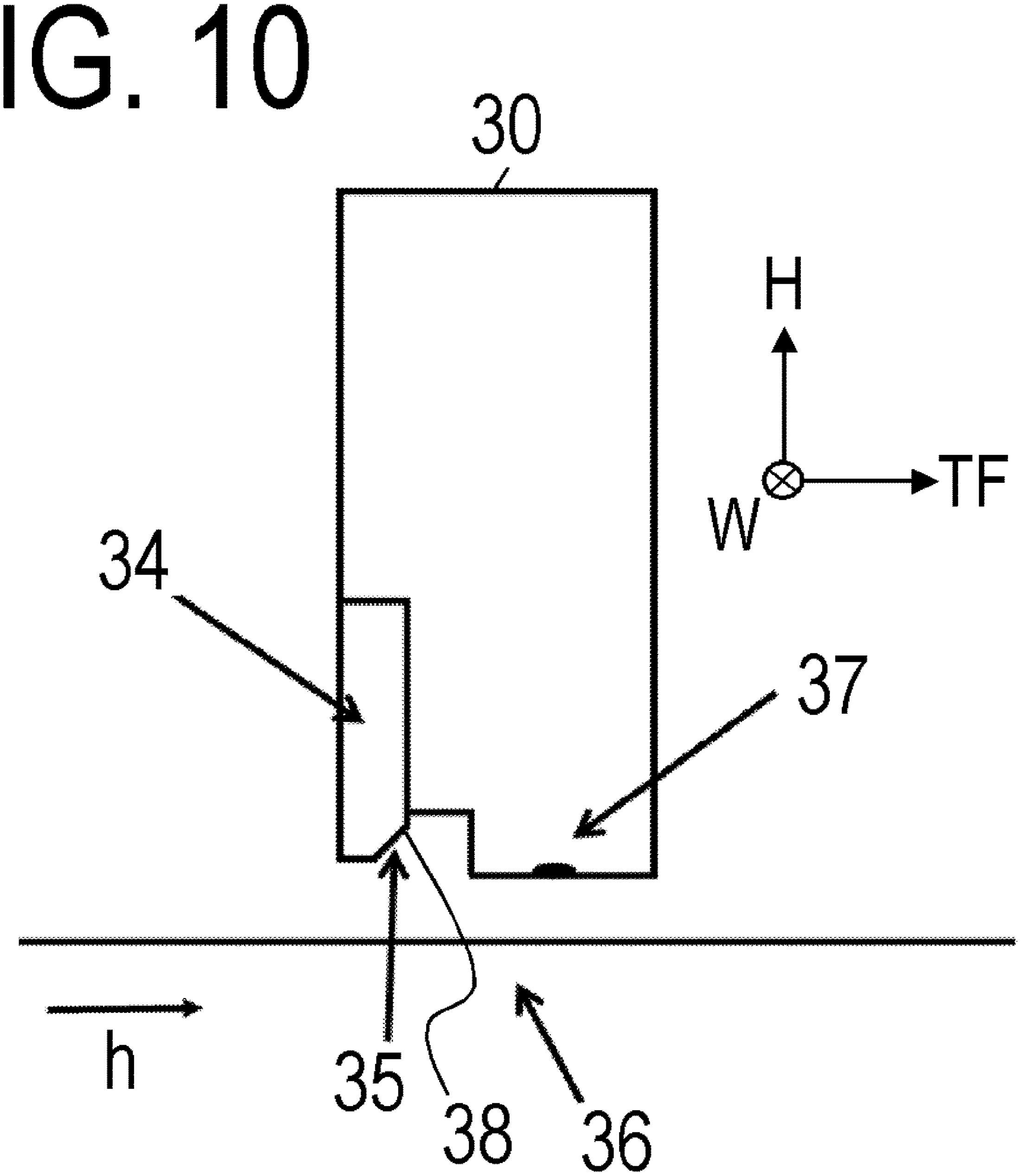
FIG. 10 is an enlarged view of the air blowing mechanism 34 and the recording head 30.

FIG. 10 illustrates examples of the enlarged air blowing mechanism 34 and recording head 30 in FIG. 8. In the drawing, the air blowing mechanism 34 is integrated with the recording head 30, and air is actively blown into a gap between the liquid-ejected medium 36 conveyed by the transfer drum (transfer cylinder) 41 as a conveyance portion and the ejection surface 37. An air supply mechanism (air flow supply portion) for blowing out air is disposed outside the air blowing mechanism 34 and supplies air to the air blowing mechanism 34. An air supply pipe 210 for supplying air to the air blowing mechanism 34 is disposed, the air supply pipe 210 is connected to an air supply pressure source 212 such as a pump, and an air supply adjustment valve 211 for adjusting a flow rate is connected to each of the pipes. In the present example, the air blow-out port 35 for blowing air is provided throughout the entire region of 800 mm in the line recording head longitudinal direction.

Figure 11:
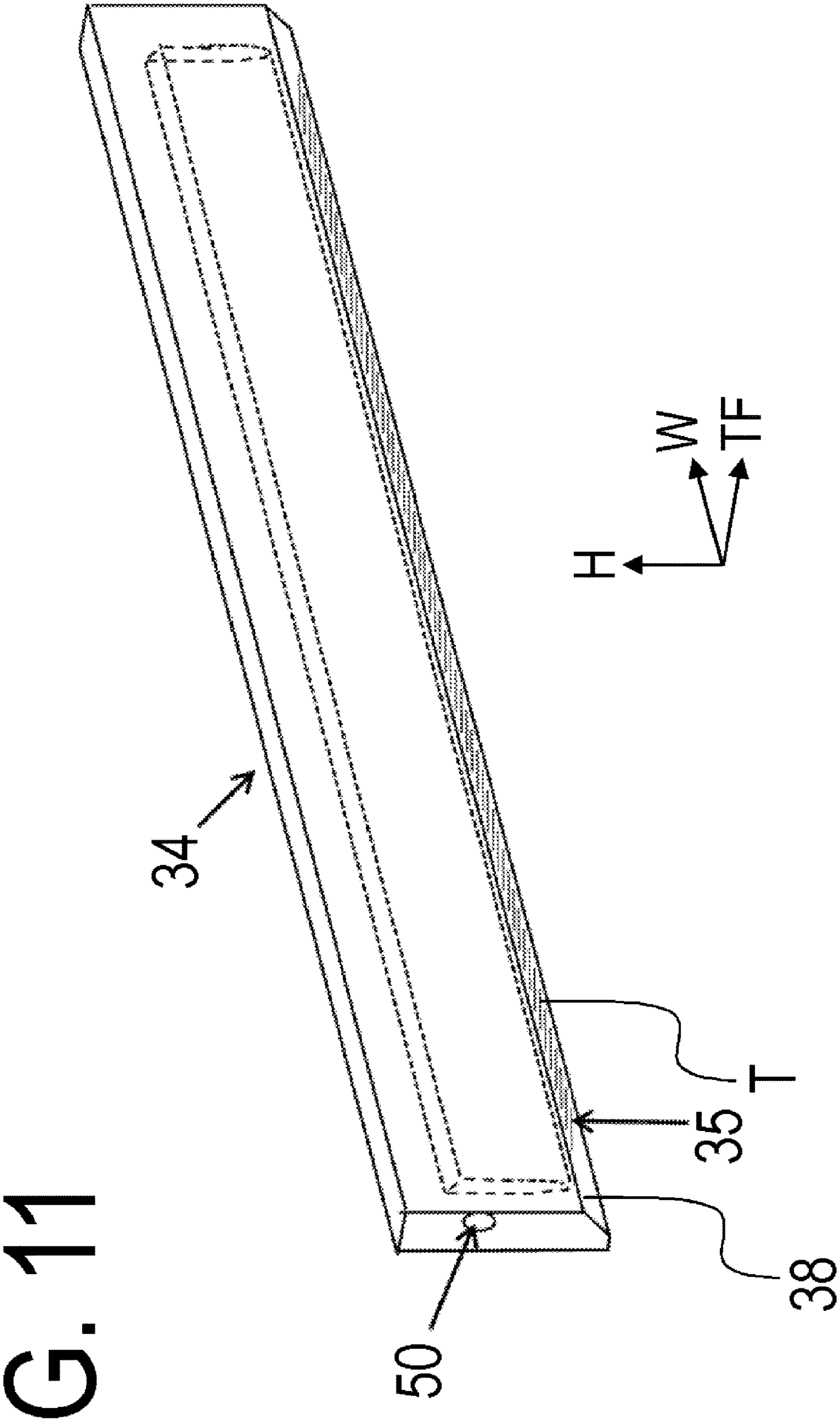
FIG. 11 is a perspective view of the air blowing mechanism 34.

FIG. 11 is a perspective view illustrating the appearance of the air blowing mechanism 34 removed from the recording head. An air supply hole 50 is provided in the side surface of the air blowing mechanism 34 in the longitudinal direction, and a joint for connection to the air supply pipe 210 is connected thereto. Further, in order to blow out air from the upstream side of the recording head 30 toward a gap between the liquid-ejected medium 36 and the ejection surface 37, a surface (opposing surface) 38 of the air blowing mechanism 34 provided with the air blow-out port 35 is inclined toward the liquid-ejected medium 36. That is, the surface 38 faces a direction inclined to face the downstream side in a relative moving direction TF with respect to a height direction H orthogonal to the relative moving direction (a conveying direction of the liquid-ejected medium 36) TF between the recording head 30 and the liquid-ejected medium 36 for the conveyance region of the liquid-ejected medium 36. In the present example, a gap between the recording head 30 and the liquid-ejected medium 36 (a shortest distance in the height direction H) is assumed to be 1.8 mm, but the effect of the present invention is exhibited even in other gap dimensions. This is the same in the other examples unless otherwise specified.

Figure 12:
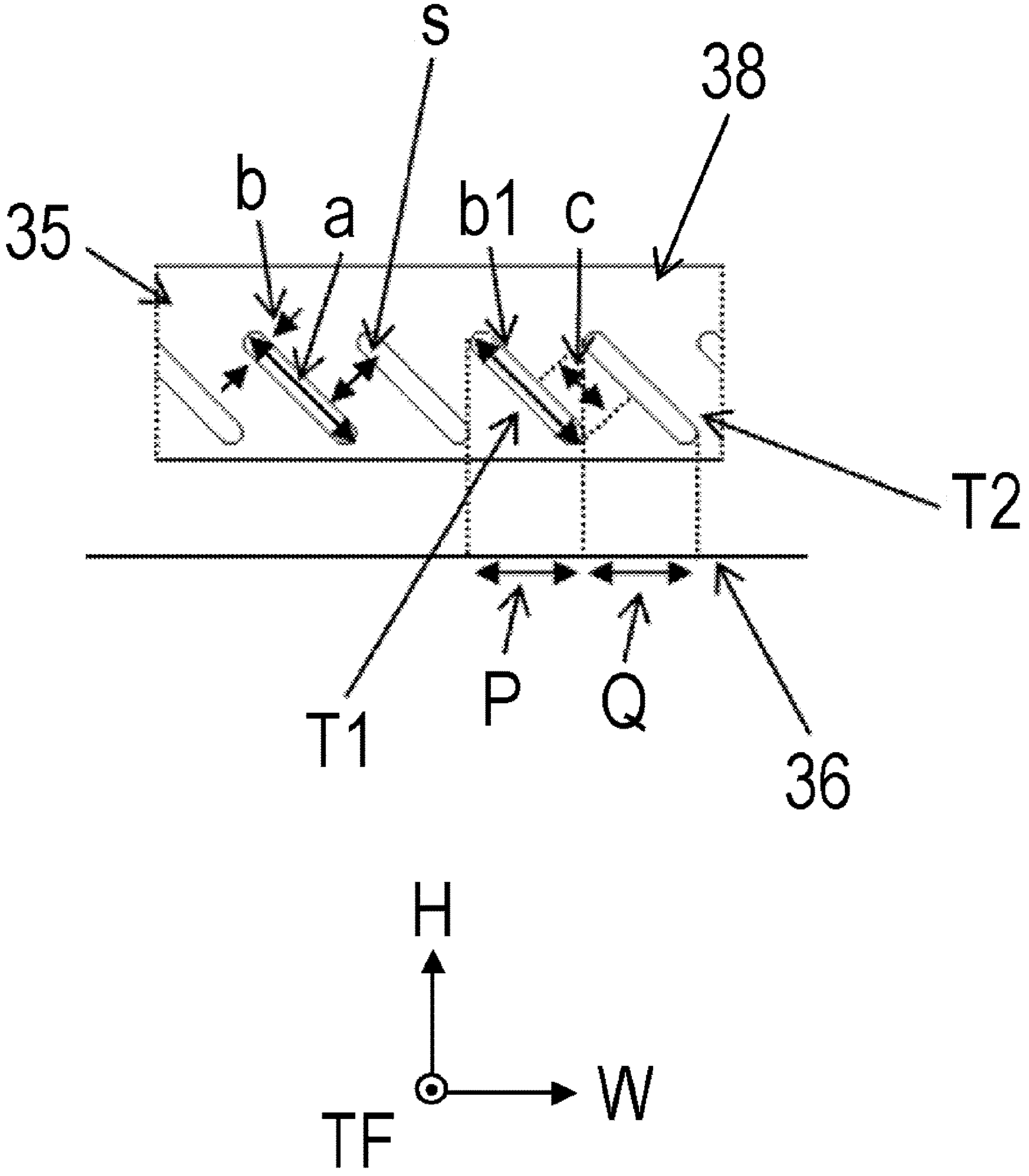
FIG. 12 is a partially enlarged view of an air blow-out port surface of the air blowing mechanism 34 in Example 1.

In the present invention, the air blow-out port 35 is constituted by a plurality of rectangular slits having a substantially rectangular shape which is opened, the arrangement direction of the plurality of rectangular slits is parallel to the liquid-ejected medium 36, and FIG. 12 illustrates an enlarged portion of the rectangular slit. That is, a plurality of rectangular slits T constituting the air blow-out port 35 are disposed to be lined up in a direction orthogonal to a relative moving direction TF between the recording head 30 and the liquid-ejected medium 36 (that is, the conveying direction of the liquid-ejected medium 36) on the opposing surface 38.

FIG. 12 illustrates an opening surface of the air blow-out port 35 of the air blowing mechanism 34 so as to be parallel to the surface of the paper. The rectangular slit of the present example is constituted by a long side having a length a=2.6 mm and a short side having a length b=0.4 mm, and the rectangular slits are opened to be inclined at 45 degrees in the arrangement direction of the rectangular slits. In the present example, a total of 355 rectangular slits are configured throughout 800 mm in the line recording head longitudinal direction in order to cover the entire region of the liquid-ejected medium 36 in a width direction W orthogonal to the conveying direction. In a case where an air capacity of 110 l/min is blown out from the air blowing mechanism 34, an average wind speed V of air from one rectangular slit is 3.9 m/s. In the present example, air blown into a gap between the recording head 30 and the liquid-ejected medium 36 is smoothed at a position of m=20 mm in a conveying direction h from the rectangular slit, and thus a maximum value maxS of a shortest distance between long sides of adjacent rectangular slits is calculated as follows.

$$d = (b \times m)^{-1/4}$$
$$= 0.71$$
$$\max S = (b/m)^{-1/2} \times V^{-d}$$
$$= 5.0$$

That is, maxS=5.0 mm.

Similarly, in a case where an air capacity of 40 l/min is blown out from the air blowing mechanism 34 using the rectangular slit of the present example, an average wind speed V of air from one rectangular slit is 1.4 m/s. In addition, air blown into a gap between the recording head 30 and the liquid-ejected medium 36 at a position of m=20 mm in the conveying direction h from the rectangular slit is smoothed, and thus a maximum value maxS of a shortest distance between long sides of adjacent rectangular slits is maxS=7 mm. It is necessary to dispose slits so that a shortest distance is set to 5.0 mm or less in a case where an air capacity of 110 l/min is blown out using the rectangular slit of the present example, and a shortest distance is set to 7.0 mm or less in a case where an air capacity of 40 l/min is blown out. In the present example, the slits are disposed such that a shortest distance s between long sides of adjacent rectangular slits is set to 1 mm. Further, in the present example, a short side of a rectangular slit is rounded by a circle of φ0.4 mm at the time of manufacturing.

As illustrated in FIG. 12, in the present example, a plurality of rectangular slits T are disposed to be inclined at the same angle with respect to a direction orthogonal to the conveying direction of the liquid-ejected medium 36. Note that, in the present example, a configuration in which the arrangement direction of a plurality of rectangular slits T is orthogonal to the conveying direction of the liquid-ejected medium 36 (a relative moving direction between the recording head 30 and the liquid-ejected medium 36) is adopted, but the arrangement direction may be a direction intersecting the orthogonal direction at a slight angle. In addition, the rectangular slits are disposed such that an orthogonal projection P of a long side of a first rectangular slit T1 with respect to the liquid-ejected medium 36 and an orthogonal projection Q of a long side of a second rectangular slit T2 are similarly continuous.

In the present example, an oriented distance c of orthogonal projections between the long side of the first rectangular slit T1 and the long side of the second rectangular slit T2 is 1.3 mm. The oriented distance c is a distance in a direction along long sides of regions facing each other in a direction orthogonal to the long sides of the rectangular slits T1 and T2 adjacent to each other.

In the present example, in a case where a maximum wind speed and a minimum wind speed of air blown into a gap between the line recording head and the liquid-ejected medium 36 at a position of m=20 mm in the conveying direction from the rectangular slit are assumed to be maxv and minv, respectively, it is desirable that smoothing is performed such that minv/maxv≥0.5. Although the air blown through the gap slightly affects ejected ink droplets and causes some distortion, a wind speed distribution of the blown air is smoothed, and thus a distortion occurs uniformly in the entire region in the longitudinal direction. As a result, print quality does not deteriorate. However, in a case where minv/maxv<0.5, a distortion does not occur uniformly in the entire region in the longitudinal direction depending on the strength of a wind speed distribution of the blown air. For this reason, a landing position is shifted in the longitudinal direction, which results in deterioration of print quality. This is the same in the other examples.

When calculation is performed through simulation in the case of Lr=110 l/min by using the present example, the following results are obtained.

maxv=2.1 m/sec minv=1.8 m/sec minv/maxv=0.85

In addition, when Lr=40 l/min, the following results are obtained.

maxv=0.7 m/sec minv=0.8 m/sec minv/maxv=0.85

As the rectangular slit used in the present example, a rectangular slit satisfying the means of the present invention which is not illustrated in the drawing is used. In the rectangular slit, a shortest distance between long sides (the shortest opposing distance in a direction orthogonal to the long side between adjacent rectangular slits) s is set to 2 mm. Then, when Lr=110 l/min, a ratio of a maximum speed maxv to a minimum speed minv under the recording head is minv/maxv=0.75

And it can be understood that the wind speed of air blown into a gap between the recording head 30 and the liquid-ejected medium 36 is smoothed when the range of the present invention is satisfied.

In a case where a rectangular slit satisfies a relationship of a ≥3×b, an action of air blown out from a rectangular jet-type air blow-out port is conceivable. Regarding air from a short side at the center of the rectangular slit satisfying a ≥3×b, the wind speed spreads like a fan according to a distance from the slit. However, regarding air from a long side at the center of the slit, even after the air is blown out from the slit, the width of the long side is maintained, and the wind speed on the long side is weakened as a whole and does not spread. Further, regarding air blown out from the air blow-out port, it can be understood that the wind speed at the end of the long side is significantly weakened as compared with the wind speed at the center of the long side. For this reason, in the present invention, an oriented distance c between orthogonal projections of adjacent rectangular slits is 1.3 mm, and an orthogonal projection position of the center of the long side of the second rectangular slit T2 with respect to the long side of the first rectangular slit T1 overlaps the end of the long side of the first rectangular slit T1. In this manner, a location where the wind speed of the long side of the first rectangular slit T1 is strong and a location where the wind speed of the long side of the second rectangular slit T2 is weak are disposed to overlap each other.

When the arrangement of the rectangular slits satisfies 0<c, the orthogonal projection position of the center of the long side of the second rectangular slit T2 with respect to the long side of the first rectangular slit T1 overlaps the long side of the first rectangular slit T1. For this reason, a location where the wind speed of the long side of the second rectangular slit T2 is weak overlaps the long side of the first rectangular slit T1. In addition, the wind speed of air blown out from the air blow-out port at a position of m=20 mm in the conveying direction h is easily smoothed, and thus it is possible to reduce the strength of a distribution of the wind speed.

Although the orthogonal projection P and the orthogonal projection Q do not overlap each other in the present example, there is no problem even if the rectangular slits are disposed so that the orthogonal projection P and the orthogonal projection Q overlap each other. When an air flow is blown out from the air blowing mechanism 34, it is possible to discharge water vapor between the recording head 30 and the surface of the liquid-ejected medium 36 from under the recording head before water vapor evaporating from ink at the time of ejection reaches the recording head and to prevent vapor condensation from occurring in the vicinity of the recording head.

In the present example, when a flow rate Lr of air blown out from the air blowing mechanism 34 is set to 20 to 120 l/min, an average speed v of air blown into a gap between the recording head 30 and the liquid-ejected medium 36 is 0.3 m/s≤v≤2.5 m/s.

When the average speed v is less than 0.3 m/s, a blow-in speed is low, and thus water vapor reaches the vicinity of the recording head surface before air including a large amount of moisture evaporating from ink droplets between the recording head 30 and the liquid-ejected medium 36 is discharged. The water vapor having reached the recording head surface is difficult to be dried by air blown in thereafter, and there is a possibility that vapor condensation will occur in the vicinity of the recording head. When vapor condensation occurs in the vicinity of the recording head, it is difficult to stably eject ink, which results in a concern that print quality may deteriorate due to simultaneous ejection of the condensed moisture.

Further, in a case where an average wind speed of air passing under the recording head is higher than 2.5 m/s, the wind speed of the blown air is excessively high, which greatly affects ink droplets, and there is a possibility that the occurrence of a distortion will vary. In this case, even when water vapor can be discharged, the accuracy of landing of ink is affected, and consequently, it becomes difficult to maintain good print quality. This is the same in the other examples.

Figure 19:
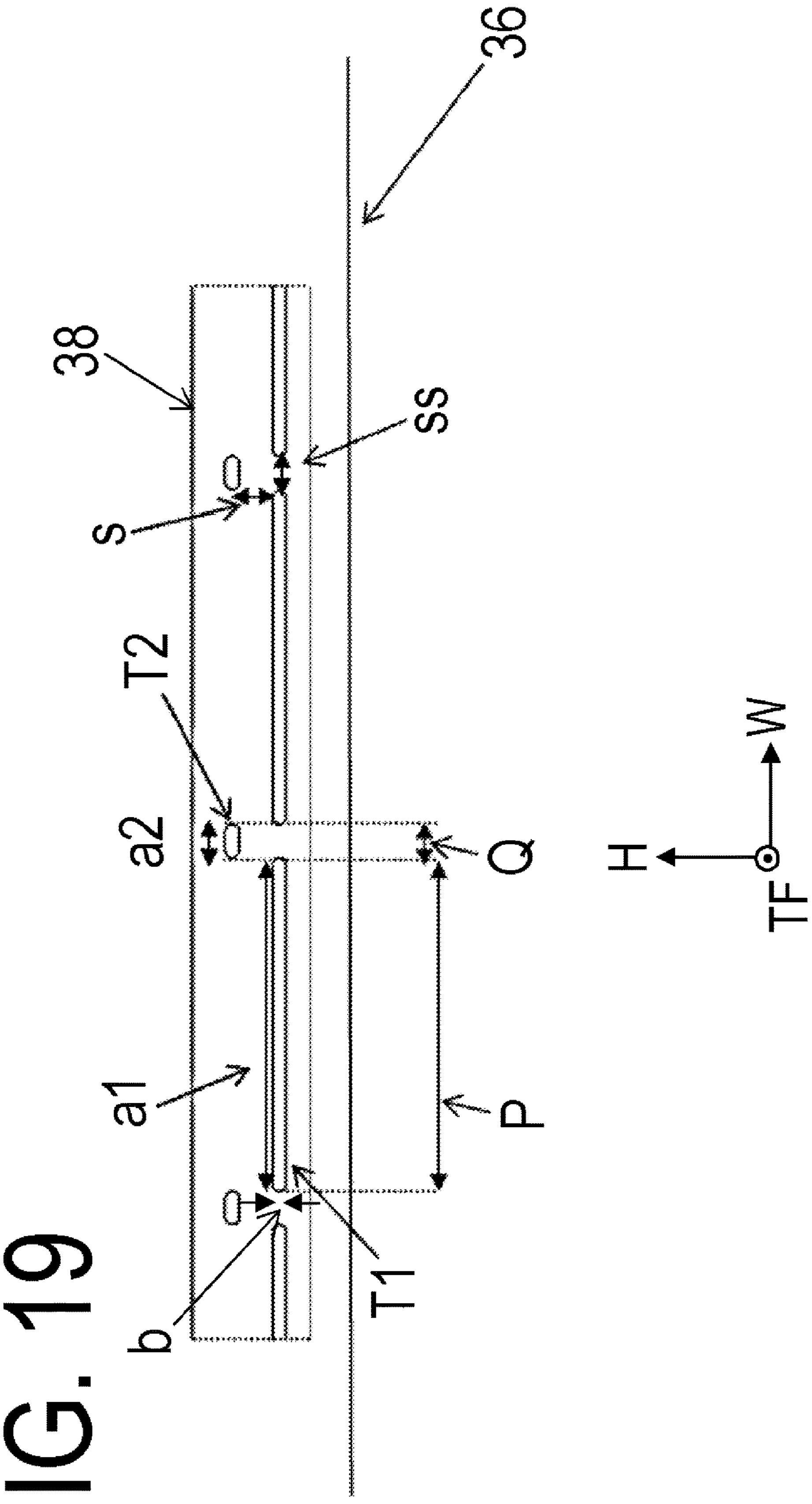
FIG. 19 is a partially enlarged view of the air blow-out port surface.

Rectangular slits of the air blowing mechanism 34 according to a comparative example which does not constitute the present invention are illustrated in FIGS. 18 and 19.

The rectangular slit in FIG. 18 is configured such that a long side has a length a of 10 mm and a short side has a length b of 0.4 mm, and the long sides of the rectangular slits are disposed in parallel with the liquid-ejected medium 36. In addition, an end side of the rectangular slit is rounded by a circle of φ0.4 mm at the time of manufacturing. In FIG. 18, the rectangular slits are disposed such that a shortest distance ss between a short side of a certain rectangular slit and a short side of an adjacent rectangular slit is 1 mm. The configuration in FIG. 18 is different from the configuration in the present example. In this configuration, 71 rectangular slits are configured throughout a region of 800 mm in the longitudinal direction of the line recording head.

In the configuration of FIG. 18, the orthogonal projection P of the long side of the first rectangular slit T1 with respect to the liquid-ejected medium 36 and the orthogonal projection Q of the long side of the second rectangular slit T2 are not similarly continuous. Further, in the present comparative example, the orthogonal projection Q of the long side of the second rectangular slit T2 and the long side of the first rectangular slit T1 do not overlap each other, and when the length of the long side of the first rectangular slit T1 is set to be b1, an oriented distance c is 0.

In addition, a maximum wind speed maxv and a minimum wind speed minv of air blown in under the recording head in the longitudinal direction of the line recording head at a position of 20 mm in the conveying direction from the rectangular slit in FIG. 18 are calculated as follows.

When Lr=110 l/min
maxv=2.9 m/sec
minv=0.45 m/sec, and
minv/maxv=0.16

And it can be understood that the wind speed is not smoothed under the recording head and has a distribution.

An air blow-out port in FIG. 19 is constituted by two types of rectangular slits. A first rectangular slit T1 is configured such that a long side has a length a1 of 10 mm and a short side has a length b of 0.4 mm, and the long sides of the rectangular slits are disposed in parallel with the liquid-ejected medium 36 and are opened. A second rectangular slit T2 is configured such that a long side has a length a2 of 1 mm and a short side has a length b of 0.4 mm, and the long sides of the rectangular slits are disposed in parallel with the liquid-ejected medium 36 and are opened. In addition, an end side of the rectangular slit is rounded by a circle of φ0.4 mm at the time of manufacturing.

The first rectangular slit T1 is disposed such that a distance between a short side of a certain rectangular slit of the first rectangular slit T1 and a short side of an adjacent rectangular slit is set to 1 mm A shortest distance s between the long side of the second rectangular slit T2 and the long side of the first rectangular slit T1 is 1 mm, which is the same as in the example of the present invention. 71 first rectangular slits T1 and 70 second rectangular slits T2 are disposed throughout a region of 800 mm in the longitudinal direction of the full line recording head. In the configuration of FIG. 19, the orthogonal projection P of the long side of the first rectangular slit T1 with respect to the liquid-ejected medium 36 and the orthogonal projection Q of the long side of the second rectangular slit T2 are continuous.

However, the first and second rectangular slits T1 and T2 are disposed so as not to overlap each other at an oriented distance c of 0 between the orthogonal projections between the long side of the first rectangular slit T1 and the long side of the second rectangular slit T2. This is a configuration different from that in the present example. In addition, a maximum wind speed maxv and a minimum wind speed minv of air blown in under the recording head in the longitudinal direction of the line recording head at a position of m=20 mm in the conveying direction h from the rectangular slit in FIG. 19 are calculated as follows.

When Lr=110 l/min
maxv=2.7 m/sec
minv=1.2 m/sec, and
minv/maxv=0.44

In the air blowing mechanism 34 as illustrated in FIGS. 18 and 19 which does not constitute the present invention, an oriented distance c between orthogonal projections of a certain rectangular slit and an adjacent rectangular slit is 0. For this reason, air blown out from a certain rectangular slit less overlaps air blown out from an adjacent rectangular slit at a position where a wind speed of the air having been blown out from the certain rectangular slit is m=20 mm in the conveying direction h. Regarding the wind speed of the air blown out at the position of m=20 mm, a wind speed vm between the first rectangular slit T1 and the second rectangular slit T2 becomes lower than a wind speed vc of air blown out from the center of the rectangular slit. For this reason, a relationship of $vm/vc<0.5$ is established, the wind speed of air passing under the recording head is not smoothed and has a distribution as a whole. In this case, the wind speed of the blown air has strength and weakness of a distribution, which affects ink droplets, and a distortion does not occur uniformly over the entire region in the longitudinal direction. Thus, a landing position is shifted in the longitudinal direction, which leads to deterioration of print quality.

As described above, when the present invention is used, the wind speed of air blown out from the air blowing mechanism 34 can be smoothed in a gap between the recording head 30 and the liquid-ejected medium 36 even when there is a physically blocked portion where air is not blown out. Air blown into the gap between the recording head and the liquid-ejected medium slightly affects ink droplets, thereby causing a distortion. However, since the wind speed of blown air is smoothed in the configuration of the present invention, a distortion occurs uniformly in the entire region in the longitudinal direction, and consequently, print quality does not deteriorate. In addition, when air passes through the gap between the recording head 30 and the liquid-ejected medium 36 at the time of ejection, it is possible to discharge water vapor between the surface of the liquid-ejected medium and the recording head from under the recording head before water vapor evaporating from ink droplets reaches the recording head 30. In this manner, it is possible to prevent vapor condensation from occurring in the vicinity of the recording head. Vapor condensation under the recording head 30 is suppressed, and thus it is possible to prevent the liquid-ejected medium 36 from being contaminated due to vapor condensation becoming droplets and the droplets falling on the liquid-ejected medium 36. Thus, the present example is used, it is possible to maintain good print quality.

In the present example, the configuration can be applied to a transfer-type inkjet recording device configured such that the liquid-ejected medium 36 is set to be the transfer body 2, and ink ejected to the transfer body 2 is transferred to paper, cloth, a plastic film, or the like which is a recording medium. Alternatively, the configuration can also be applied to a direct drawing type inkjet recording device in which the liquid-ejected medium 36 is set to be a recording medium, and printing is performed by directly ejecting ink to the recording medium. This is the same in the other examples.

In the present example, when an ink coverage of ejected ink in the liquid-ejected medium 36 is 25% or more, air is blown out from the air blow-out port 35 during printing, and thus it is possible to suppress vapor condensation in the vicinity of the recording head. When the ink coverage of the liquid-ejected medium 36 is less than 25%, the amount of ink is small, and the amount of water vapor to be generated is small. That is, there is little water vapor adhering to the vicinity of the head, and vapor condensation less occurs in the vicinity of the head due to the water vapor becoming droplets. For this reason, when an ink coverage in the liquid-ejected medium 36 is less than 25%, there is no problem even if air is not blown out from the air blow-out port 35 during printing. At this time, in order to dry the water vapor in the vicinity of the head, air may be blown out from the air blow-out port while printing is not performed. This is the same in the other examples.

Example 2

Example 2 of the present invention will be described with reference to FIG. 13. Note that, in the following description, the matters in Example 2 which are common to Example 1 will not be described. A configuration of Example 2 which is not particularly described below is the same as that in Example 1.

Figure 13:
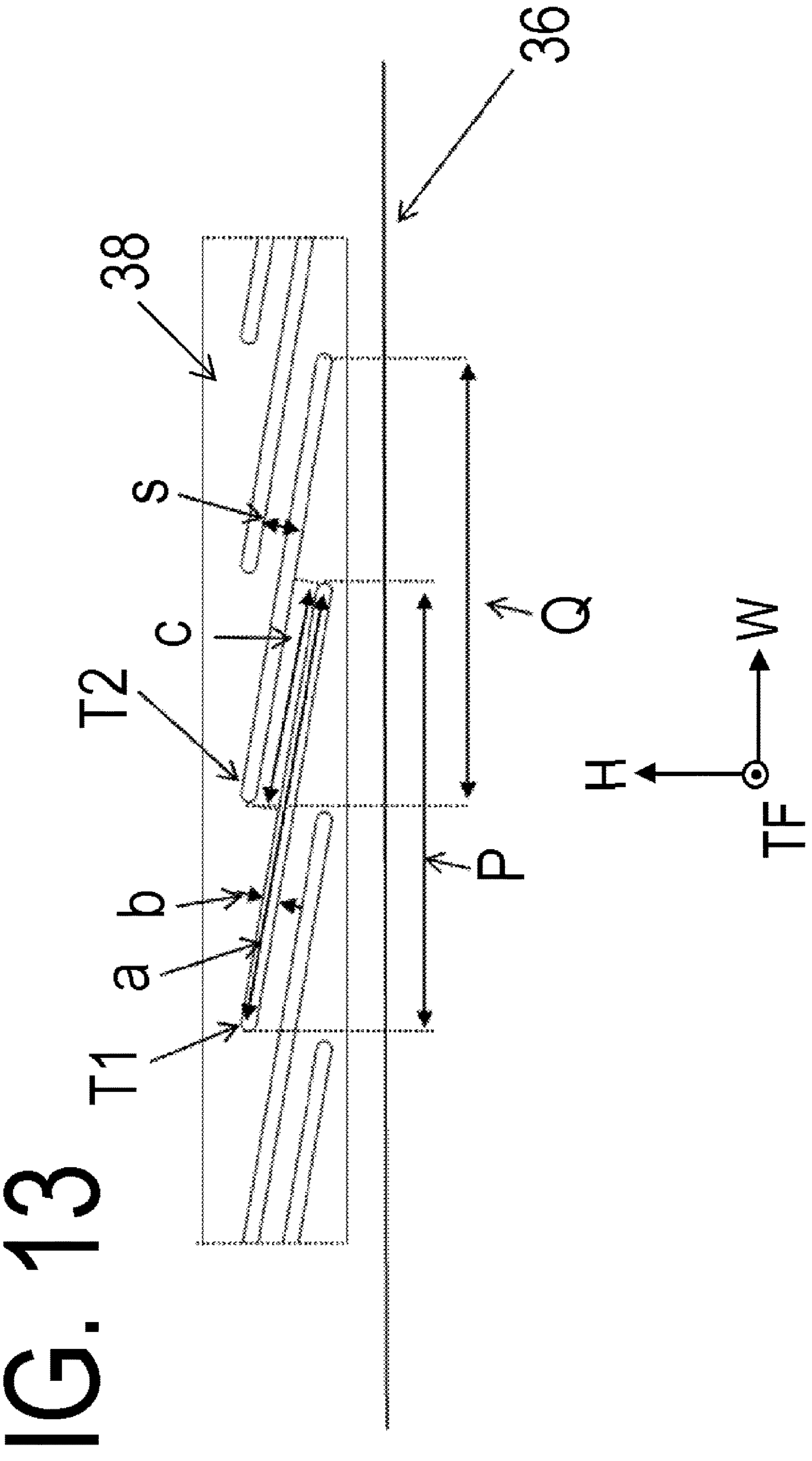
FIG. 13 is a partially enlarged view of an air blow-out port surface of the air blowing mechanism 34 in Example 2.

FIG. 13 is a partially enlarged view of a plurality of rectangular slits having an opened rectangular shape of the air blow-in port 35 in the present example, and illustrates the surface of a certain air blowing mechanism 34 of the air blow-in port 35 on a plane of the paper. The rectangular slit in FIG. 13 is configured such that a long side has a length a of 11.9 mm and a short side has a length b of 0.4 mm, and the rectangular slits are opened to be inclined at 10 degrees in the arrangement direction of the slits. Further, in order to smooth the wind speed of air blown out at a position of m=20 mm in the conveying direction h from the rectangular slit, a shortest distance s between the long side of the rectangular slit and the long side of an adjacent rectangular slit is set to 0.65 mm. In the present example, a total of 125 rectangular slits are opened throughout a region of 800 mm in the longitudinal direction of the full line recording head. In the present example, an end side of the rectangular slit is rounded by a circle of φ0.4 mm at the time of manufacturing. In addition, an oriented distance c is 6 mm. In addition, a plurality of rectangular slits T of the present example are disposed so as to partially overlap each other when viewed in the conveying direction of the liquid-ejected medium 36 (a relative moving direction between the recording head 30 and the liquid-ejected medium 36).

Signs are the same as those in Example 1, and thus the description thereof will be omitted.

According to the present example, a flow rate Lr of air blown out from the air blowing mechanism 34 is as follows.

When Lr=110 l/min
maxv=1.90 m/sec
minv=1.36 m/sec, and
minv/maxv=0.71

In addition, when Lr=40 l/min
maxv=0.60 m/sec
minv=0.44 m/sec, and
minv/maxv=0.73

In the present example, the wind speed of air blown into a gap between the recording head 30 and the liquid-ejected medium 36 at the time of ejection is uniformly smoothed in the longitudinal direction of the line recording head. Since the wind speed of the blown air is smoothed, a distortion occurs uniformly in the entire region in the longitudinal direction, and consequently, print quality does not deteriorate. In addition, it is possible to discharge water vapor between the surface of the liquid-ejected medium and the recording head from under the recording head before water vapor evaporating from ink at the time of ejection reaches the recording head and to prevent vapor condensation from occurring in the vicinity of the recording head. It is possible to maintain good ink ejection accuracy by preventing vapor condensation from occurring in the vicinity of the recording head.

Example 3

Figure 14:
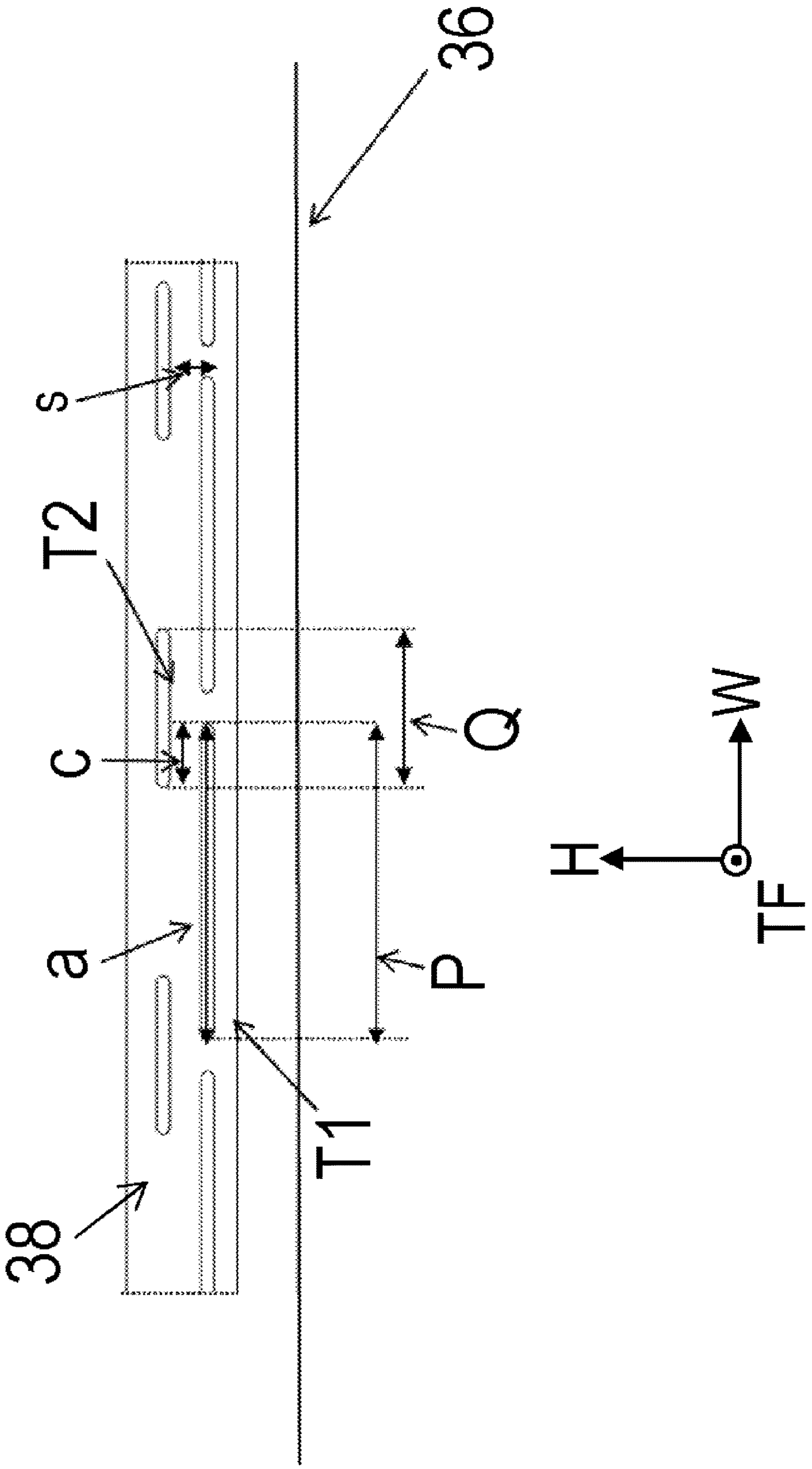
FIG. 14 is a partially enlarged view of an air blow-out port surface of the air blowing mechanism 34 in Example 3.

Example 3 of the present invention will be described with reference to FIG. 14. Note that, in the following description, the matters in Example 3 which are common to Examples 1 and 2 will not be described. A configuration of Example 3 which is not particularly described below is the same as those in Examples 1 and 2. FIG. 14 is a partially enlarged view of a plurality of rectangular slits having an opened rectangular shape of the air blow-out port 35 of the present invention, and illustrates the surface of a certain air blowing mechanism 34 of the air blow-out port 35 on a plane of the paper.

An air blow-out port in FIG. 14 is constituted by two types of rectangular slits. A first rectangular slit T1 is configured such that a long side has a length a of 10 mm and a short side has a length b of 0.4 mm, and the long sides of the rectangular slits are disposed in parallel with the liquid-ejected medium 36 and are opened. A second rectangular slit T2 is configured such that a long side has a length a of 5 mm and a short side has a length b of 0.4 mm, and the long sides of the rectangular slits are disposed in parallel with the liquid-ejected medium and are opened. In addition, an end side of the rectangular slit is rounded by a circle of φ0.4 mm at the time of manufacturing. In order to smooth the wind speed of air blown out at a position of m=20 mm in the conveying direction from the rectangular slit, a shortest distance s between the long side of the first rectangular slit T1 and the long side of the second rectangular slit T2 is set to 1 mm. In the present example, a total of 72 first rectangular slits and a total of 71 second rectangular slits are opened throughout a region of 800 mm in the longitudinal direction of the full line recording head.

In the present example, an end side of the rectangular slit is rounded by a circle of φ0.4 mm at the time of manufacturing. In addition, an oriented distance c is 6 mm That is, in the present example, adjacent rectangular slits T are disposed to be staggered in the conveying direction of the liquid-ejected medium 36 (a relative moving direction between the recording head 30 and the liquid-ejected medium 36) and to form a partially overlapping portion when viewed in the conveying direction, and an oriented distance c is formed.

Signs are the same as those in Example 1, and thus the description thereof will be omitted.

A flow rate Lr of air blown out from the air blowing mechanism 34 is as follows.

When Lr=110 l/min
maxv=2.0 m/sec
minv=1.4 m/sec, and
minv/maxv=0.7

Even when rectangular slits having a plurality of shapes are configured using the present invention, air blown into a gap between the recording head and the liquid-ejected medium at the time of ejection can be smoothed in the longitudinal direction of the line recording head. Since the wind speed of blown air is smoothed, a distortion occurs uniformly in the entire region in the longitudinal direction, and consequently, print quality does not deteriorate. In addition, it is possible to discharge water vapor between the surface of the liquid-ejected medium and the recording head from under the recording head before water vapor evaporating from ink at the time of ejection reaches the recording head and to prevent vapor condensation from occurring in the vicinity of the recording head. It is possible to maintain good ink ejection accuracy by preventing vapor condensation from occurring in the vicinity of the recording head.

Example 4

Example 4 of the present invention will be described with reference to FIG. 15. Note that, in the following description, the matters in Example 4 which are common to Examples 1 to 3 will not be described. A configuration of Example 4 which is not particularly described below is the same as those in Examples 1 to 3.

Figure 15:
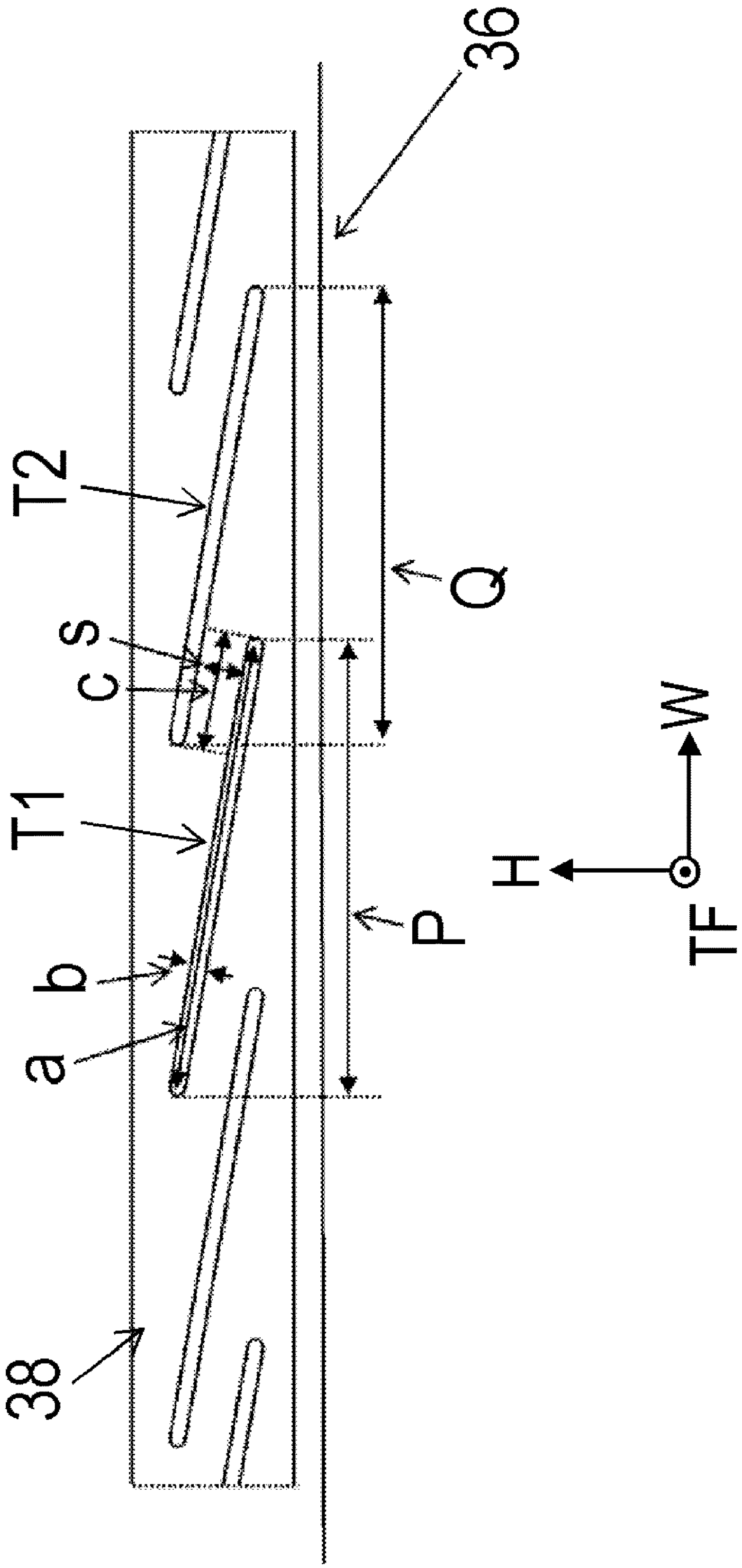
FIG. 15 is a partially enlarged view of an air blow-out port surface of the air blowing mechanism 34 in Example 4.

FIG. 15 is a partially enlarged view of a plurality of rectangular slits having an opened rectangular shape of the air blow-out port 35 of the present invention, and illustrates the surface of a certain air blowing mechanism 34 of the air blow-out port 35 on a plane of the paper. The rectangular slit in FIG. 15 is configured such that a long side has a length a of 11.9 mm and a short side has a length b of 0.4 mm, and the rectangular slits are opened to be inclined at 10 degrees in the arrangement direction of the slits. Further, in order to smooth the wind speed of air blown out with m=20 mm in the conveying direction from the rectangular slit, a shortest distance s between the long side of the rectangular slit and the long side of an adjacent rectangular slit is set to 1.16 mm. In the present example, a total of 80 rectangular slits are opened throughout a region of 800 mm in the longitudinal direction of the full line recording head. In the present example, an end side of the rectangular slit is rounded by a circle of φ0.2 mm at the time of manufacturing. In addition, c=3.05 mm in the present example.

Signs are the same as those in Example 1, and thus the description thereof will be omitted.

According to the present example, a flow rate Lr of air blown out from the air blowing mechanism 34 is as follows.

When Lr=110 l/min maxv=2.15 m/sec minv=1.27 m/sec, and minv/maxv=0.59

In addition, when Lr=40 l/min, maxv=0.68 m/sec minv=0.59 m/sec, an minv/maxv=0.87

With a configuration using the present invention, air blown into a gap between the recording head 30 and the liquid-ejected medium 36 at the time of ejection can be smoothed in the longitudinal direction of the line recording head. Since the wind speed of blown air is smoothed, a distortion occurs uniformly in the entire region in the longitudinal direction, and consequently, print quality does not deteriorate. In addition, it is possible to discharge water vapor between the surface of the liquid-ejected medium and the recording head from under the recording head before water vapor evaporating from ink at the time of ejection reaches the recording head and to prevent vapor condensation from occurring in the vicinity of the recording head. It is possible to maintain good ink ejection accuracy by preventing vapor condensation from occurring in the vicinity of the recording head.

Example 5

Example 5 of the present invention will be described with reference to FIG. 16. Note that, in the following description, the matters in Example 5 which are common to Examples 1 to 4 will not be described. A configuration of Example 5 which is not particularly described below is the same as those in Examples 1 to 4.

Figure 16:
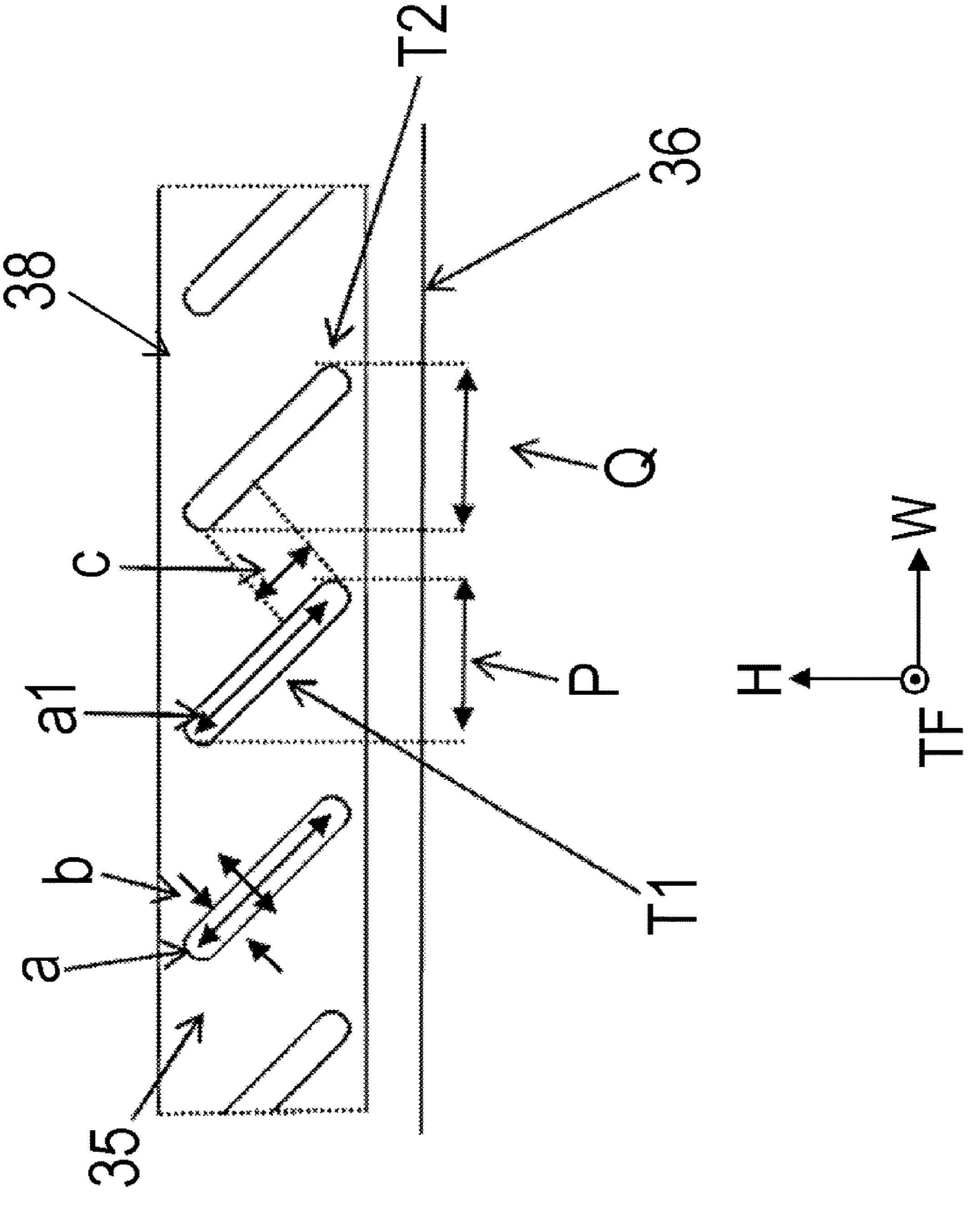
FIG. 16 is a partially enlarged view of an air blow-out port surface of the air blowing mechanism 34 in Example 5.

FIG. 16 is a partially enlarged view of a plurality of rectangular slits having an opened rectangular shape of the air blow-out port 35 of the present invention, and illustrates the surface of a certain air blowing mechanism 34 of the air blow-out port 35 on a plane of the paper. The slit in FIG. 16 is configured such that a long side has a length a of 2.6 mm and a short side has a length b of 0.4 mm, and the rectangular slits are opened to be inclined at 45 degrees in the arrangement direction of the rectangular slits. Further, in order to smooth the wind speed of air blown out with m=20 mm in the conveying direction from the rectangular slit, a shortest distance s between the long side of the rectangular slit and the long side of an adjacent rectangular slit is set to 3.425×b=1.37 mm. In the present example, a total of 125 rectangular slits are opened throughout a region of 800 mm in the longitudinal direction of the full line recording head. In the present example, an end side of the rectangular slit is rounded by a circle of φ0.4 mm at the time of manufacturing. Further, in the configuration of FIG. 16, the orthogonal projection P of the long side of the first rectangular slit T1 with respect to the liquid-ejected medium 36 and the orthogonal projection Q of the long side of the second rectangular slit T2 are not similarly continuous. In addition, the first and second rectangular slits T1 and T2 are disposed such that an oriented distance c between orthogonal projections between the long side of the first rectangular slit T1 and the long side of the second rectangular slit T2 is 0.75 mm.

According to the present example, a flow rate Lr of air blown out from the air blowing mechanism 34 is as follows.

When Lr=110 l/min maxv=2.4 m/sec minv=1.9 m/sec, and minv/maxv=0.79

When rectangular slits having a plurality of shapes are configured using the present invention, the wind speed of air blown into a gap between the recording head and the liquid-ejected medium at the time of ejection can be smoothed in the longitudinal direction of the line recording head. Since the wind speed of blown air is smoothed, a distortion occurs uniformly in the entire region in the longitudinal direction, and consequently, print quality does not deteriorate. In addition, it is possible to discharge water vapor between the surface of the liquid-ejected medium and the recording head from under the recording head before water vapor evaporating from ink at the time of ejection reaches the recording head and to prevent vapor condensation from occurring in the vicinity of the recording head. It is possible to maintain good ink ejection accuracy by preventing vapor condensation from occurring in the vicinity of the recording head.

Example 6

Example 6 of the present invention will be described with reference to FIG. 17. Note that, in the following description, the matters in Example 6 which are common to Examples 1 to 5 will not be described. A configuration of Example 6 which is not particularly described below is the same as those in Examples 1 to 5.

Figure 17:
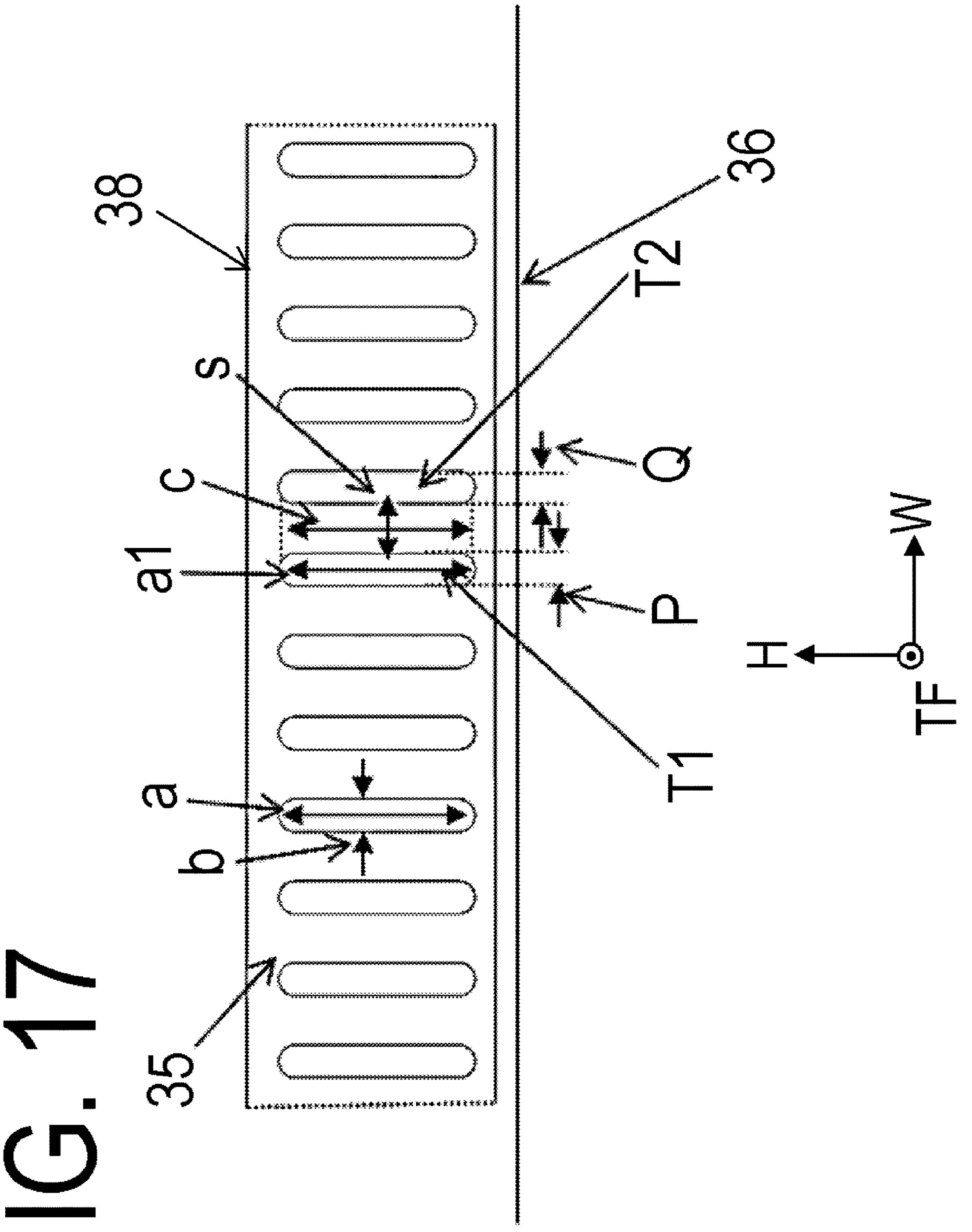
FIG. 17 is a partially enlarged view of an air blow-out port surface of the air blowing mechanism 34 in Example 6.

FIG. 17 is a partially enlarged view of a plurality of rectangular slits having an opened rectangular shape of the air blow-out port 35 of the present invention, and illustrates the surface of a certain air blowing mechanism 34 of the air blow-out port 35 on a plane of the paper. The slit in FIG. 17 is configured such that a long side has a length a of 2.6 mm and a short side has a length b of 0.4 mm, and the rectangular slits are opened to be inclined at 90 degrees in the arrangement direction of the rectangular slits. Further, in order to smooth the wind speed of air blown out with m=20 mm in the conveying direction from the rectangular slit, a shortest distance s between the long side of the rectangular slit and the long side of an adjacent rectangular slit is set to 1 mm. In the present example, a total of 270 rectangular slits are opened throughout a region of 800 mm in the longitudinal direction of the full line recording head. In the present example, an end side of the rectangular slit is rounded by a circle of φ0.4 mm at the time of manufacturing.

In the configuration of FIG. 17, an orthogonal projection P of the long side of a first rectangular slit T1 with respect to the liquid-ejected medium 36 and an orthogonal projection Q of the long side of an adjacent second rectangular slit T2 are not continuous. In addition, all regions of the long sides overlap each other in orthogonal projections when an oriented distance c between the orthogonal projections of the long side of the first rectangular slit T1 and the long side of the second rectangular slit T2 is 2.6 mm, and the rectangular slits are disposed to satisfy a relationship of $0<c$ in the present invention. That is, the plurality of rectangular slits T in the present example are disposed such that the long sides thereof extend in parallel with the conveying direction of the liquid-ejected medium 36 and overlap each other when viewed in a direction orthogonal to the conveying direction.

According to the present example, a flow rate Lr of air blown out from the air blowing mechanism 34 is as follows.

When Lr=110 l/min maxv=1.6 m/sec minv=1.0 m/sec, and minv/maxv=0.62

When rectangular slits having a plurality of shapes are configured using the present invention, the wind speed of air blown into a gap between the recording head and the liquid-ejected medium 36 at the time of ejection can be smoothed in the longitudinal direction of the line recording head. Thereby, since the wind speed of blown air is smoothed, a distortion occurs uniformly in the entire region in the longitudinal direction, and consequently, print quality does not deteriorate. In addition, it is possible to discharge water vapor between the surface of the liquid-ejected medium and the recording head from under the recording head before water vapor evaporating from ink at the time of ejection reaches the recording head and to prevent vapor condensation from occurring in the vicinity of the recording head. It is possible to maintain good ink ejection accuracy by preventing vapor condensation from occurring in the vicinity of the recording head.

Figure 20A:
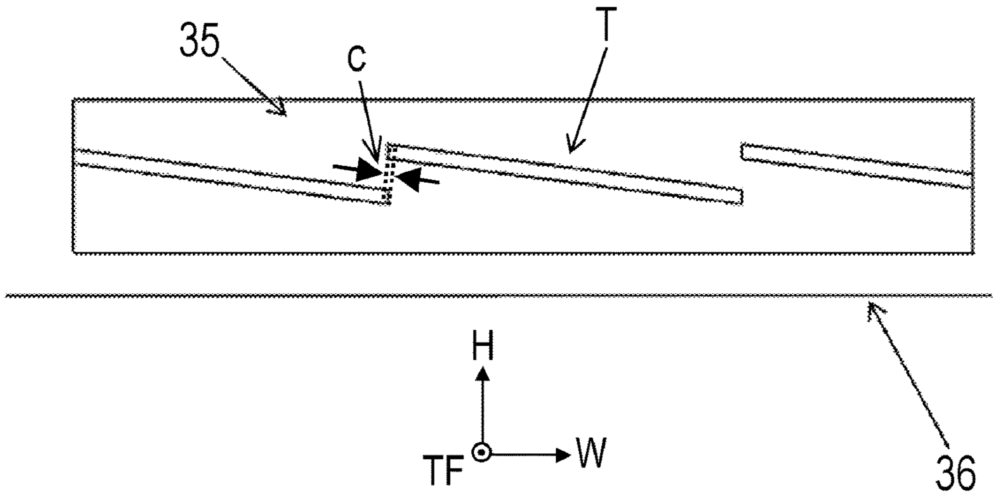
FIGS. 20A and 20B illustrates another examples of a rectangular slit.
Figure 20B:
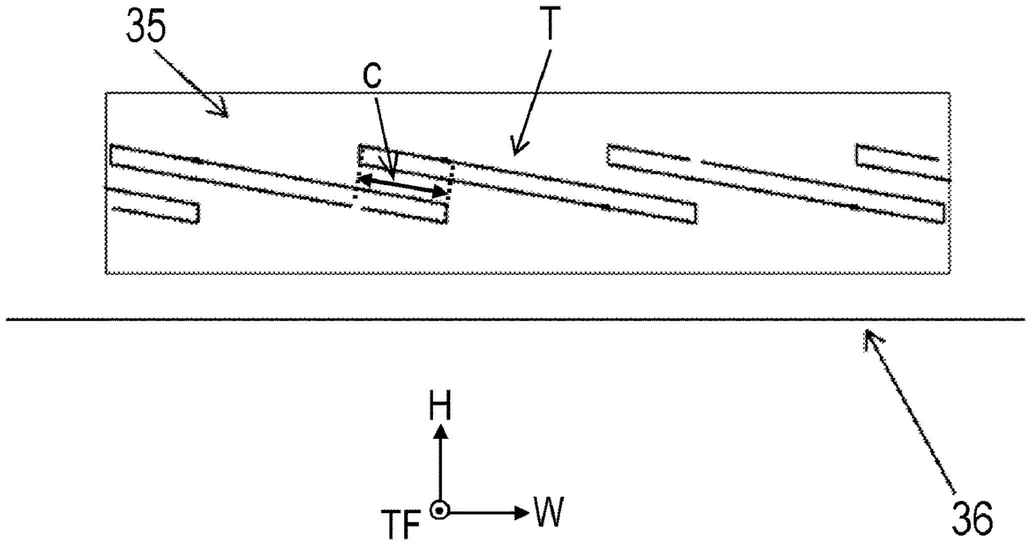

In Examples 1 to 7, the end side of the rectangular slit is rounded due to manufacturing restrictions, but if manufacturing is possible, there is no problem even if the end side is not rounded as long as the configuration of the present invention is satisfied. Examples of slits are illustrated in FIGS. 20A and 20B.

Example 7

Example 7 of the present invention will be described with reference to FIG. 9. Note that, in the following description, the matters in Example 7 which are common to Examples 1 to 6 will not be described. A configuration of Example 7 which is not particularly described below is the same as those in Examples 1 to 6.

Figure 9:
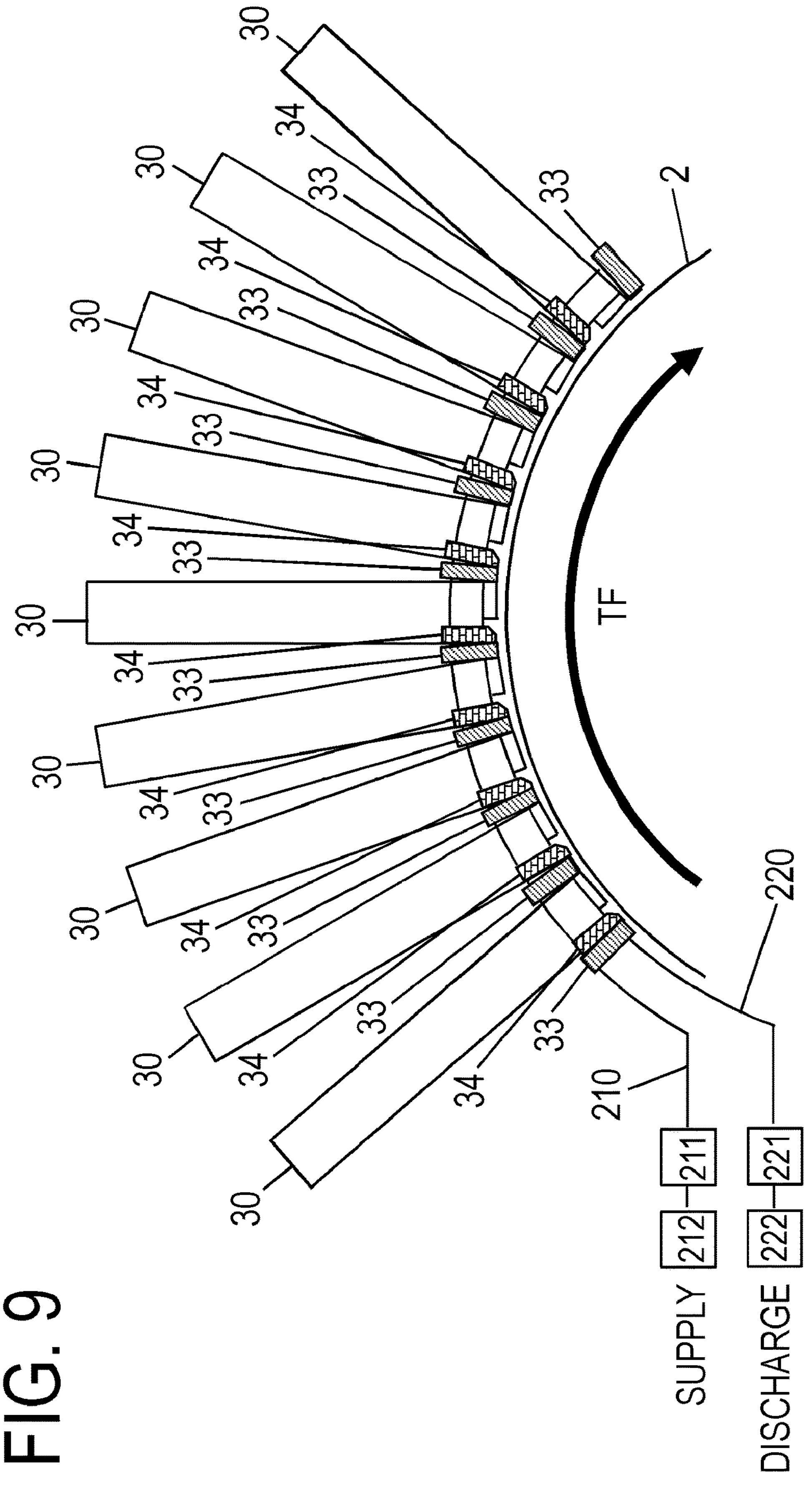
FIG. 9 is a side view illustrating an arrangement relationship between the air blowing mechanism 34, the recording head 30, and a mist collecting mechanism.

FIG. 9 is an enlarged view of the air blowing mechanism 34 having another configuration of the present invention. The air blowing mechanism 34 and a mist collecting unit 33 as a mist collecting mechanism are provided between recording heads. In the present example, as the mist collecting mechanism, the mist collecting unit 33 that collects ink mist generated at the time of ejecting ink from the recording heads is provided at eight positions sandwiched between two adjacent recording heads among nine recording heads 30. Further, the mist collecting unit 33 is also provided at a position adjacent to the most upstream recording head 30 on the upstream side and a position adjacent to the most downstream recording head 30 on the downstream side. In this manner, the recording heads 30 and the mist collecting units 33 are alternately disposed radially along the outer peripheral surface of the liquid-ejected medium 36. Each of the mist collecting units 33 includes a blow-out port for blowing out air toward the surface of the liquid-ejected medium 36 and a blow-in port for blowing in air in a lower portion of a unit housing thereof. The mist collecting unit 33 is provided with an exhaust buffer chamber that exhausts air suctioned from the blow-in port. The exhaust buffer chamber functions as a buffer space for adjusting the air pressure of exhausted air. A negative pressure generation portion 221 including a negative pressure pump 222 illustrated in FIG. 9 is connected to the exhaust buffer chamber through an air discharge port as an exhaust mechanism, and air is discharged by negative pressure. The negative pressure generation portion 221 is provided in common to the plurality of mist collecting units 33. By suctioning air from the blow-in port while blowing out clean air from the blow-out port, ink mist generated from the recording heads is effectively collected before it is widely diffused in the device. In addition, water vapor discharged from under the recording heads by the air blowing mechanism 34 can also be collected by the mist collecting mechanism. With such a configuration, it is possible to discharge water vapor discharged from under the recording heads to the outside without attaching the water vapor to the inside of the device.

In this manner, the air blowing mechanism 34 that blows out air under the recording heads and the mist collecting unit 33 that collects mist can be disposed at the same time. The air blowing mechanism 34 and the mist collecting unit 33 are configured as separate mechanisms in the drawing, but the air blowing mechanism 34 may be configured to be integrated with the mist collecting unit 33 instead of the recording heads as long as they satisfy the respective functions.

In addition, the present invention is an invention of the air blowing mechanism 34 that blows air into a gap between the recording head and the transfer body so that water vapor does not adhere to the head, but the invention of the air blowing mechanism 34 can be used for removing mist and paper dust generated even in a direct drawing type inkjet recording device without water vapor. Further, the configuration of the slit provided in the air blowing mechanism 34 can also be applied to a mechanism internal drying mechanism.

Example 8

Example 8 of the present invention will be described with reference to FIG. 21. Note that, in the following description, the matters in Example 8 which are common to Examples 1 to 7 will not be described. A configuration of Example 8 which is not particularly described below is the same as that in Examples 1 to 7.

Figure 21:
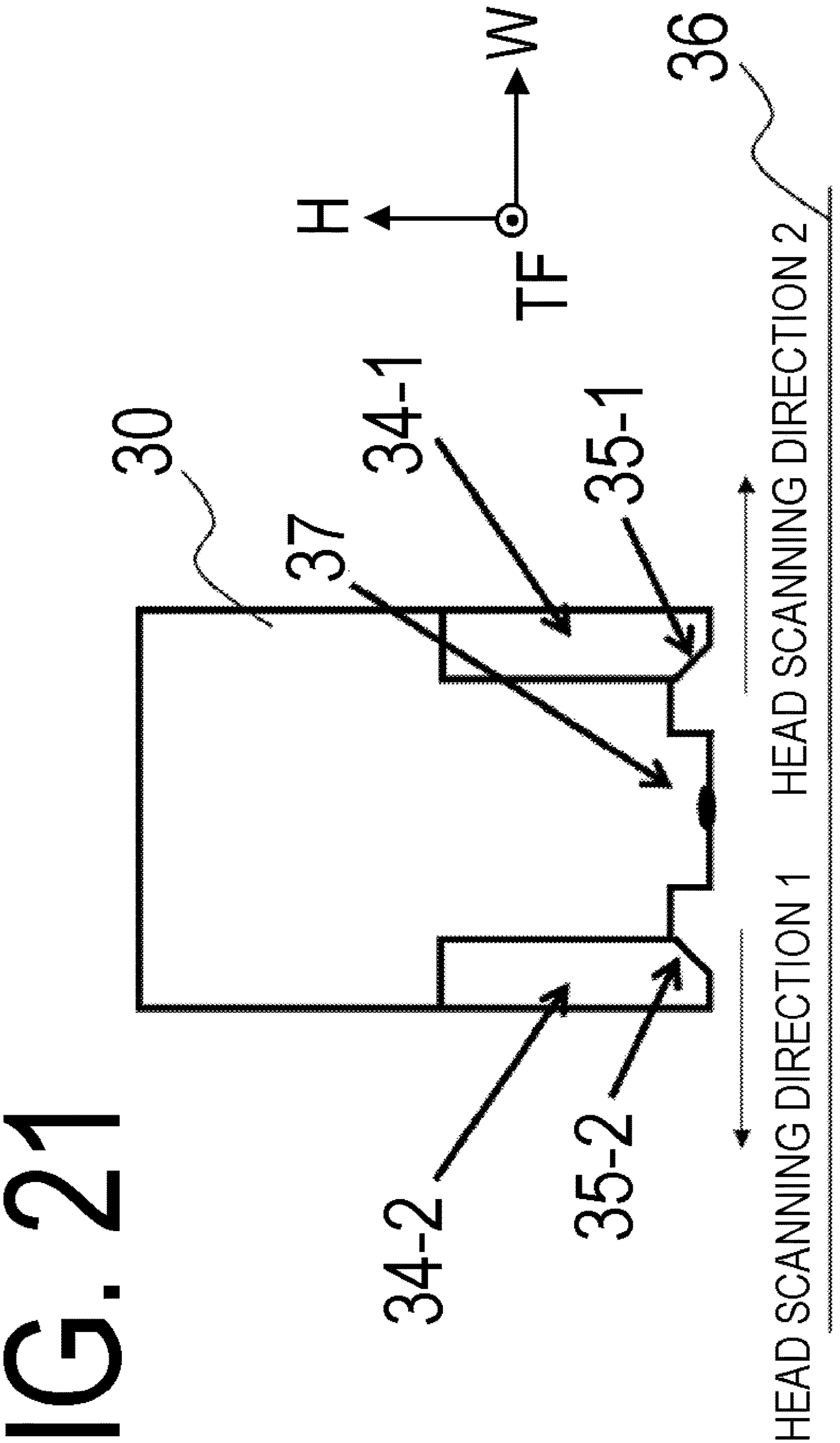
FIG. 21 illustrates another example of an inkjet recording device.

FIG. 21 illustrates an example of an inkjet recording device having another configuration of the present invention. The configuration of the present invention can also be applied to an inkjet device in which a recording head reciprocates and ejects ink. As illustrated in FIG. 21, two air blowing mechanisms 34-1 and 34-2 are attached to both sides of the recording head 30 (both sides in a scanning direction (the width direction of the liquid-ejected medium 36) W intersecting the conveying direction TF of the liquid-ejected medium 36). In a case where the recording head 30 is operated in a scanning direction 1, only the air blowing mechanism 34-1 adjacent to the recording head on the upstream side in a relative moving direction from the recording head 30 to the liquid-ejected medium 36 is driven, and the air blowing mechanism 34-2 is not driven. In a case where the recording head 30 is operated in a scanning direction 2, the air blowing mechanism 34-2 adjacent to the recording head on the upstream side in a relative moving direction from the recording head 30 to the liquid-ejected medium 36 is driven, and the air blowing mechanism 34-1 is not driven. A slit which is opened in the liquid-ejected medium 36 is configured as described in the present invention, and have the same configuration of the slits illustrated in, for example, Examples 1 to 6. Thus, a detailed configuration of the slit will not be described in the present example.

Even when the configuration of the present invention is applied to an inkjet device in which a recording head reciprocates and ejects ink as described in the present example, air can be injected into a gap between the recording head 30 and the liquid-ejected medium 36. Thereby, it is possible to discharge water vapor evaporating from ink at the time of ejection from under the recording head and to prevent vapor condensation from occurring in the vicinity of the recording head.

Although the air blowing mechanism 34 is integrated with the recording head 30 in the present example, there is no problem even if they are configured as separate bodies as long as the effects of the present invention can be obtained.

The collection of mist and vapor in the inkjet recording device for recording an image has been described in the above embodiment, but the present invention is not limited thereto. The present invention can be widely applied to mist collection and solvent vapor collection in a recording device provided with an inkjet head used for purposes other than the purpose of recording images.

Other Examples in which Configuration of the Present Embodiment is Effective In a case where it is necessary to cool a liquid-ejected medium by wind in a type of recording device or the like that heats the liquid-ejected medium, a mechanism for blowing uniform wind onto the liquid-ejected medium may be required. The configuration of the present invention is also effective in such a case.

In addition, depending on the purpose of promoting the drying of the surface of the liquid-ejected medium and printing processing of the recording device, a mechanism for cleaning the liquid-ejected medium and units associated therewith may be provided. In such a device, it may be necessary to dry or blow off a cleaning solution, but the present invention also acts effectively when such a uniform air flow is required.

Further, in a recording device that prints directly on paper or the like, paper dust may fly up to a recording head, which may hinder the ejection of ink droplets and impair image quality, and some recording devices have a mechanism for blowing an air flow against the paper before it enters a recording region. By applying the present invention to such a device, paper dust can be effectively removed with a small amount of air by making the wind speed of the blown air flow uniform.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123904, filed on Jul. 29, 2021, which is hereby incorporated by reference herein in its entirety.

What is claimed is:

1. A recording device comprising:

a recording head that ejects a liquid;

a conveyance portion that conveys a liquid-ejected medium on which the liquid is ejected so that the liquid-ejected medium passes through a position facing the recording head;

a supply portion for air; and an air blowing mechanism that is disposed on an upstream side of the recording head in a relative moving direction between the recording head and the liquid-ejected medium, the air blowing mechanism comprising an air blow-out port including a plurality of slits that are lined up in a direction intersecting the relative moving direction so that long sides of adjacent slits have regions facing each other in a direction orthogonal to the long sides, and the air blow-out port being configured to blow out air supplied from the supply portion toward a gap between the recording head and the liquid-ejected medium.

2. The recording device according to claim 1, wherein in a case where a length of the long side of the slit is a (mm) and a length of a short side thereof is b (mm), a relationship of $a \geq 3 \times b$ is satisfied.

3. The recording device according to claim 2, wherein in a case where a distance in a direction along the long side of the facing region is c (mm), a shortest opposing distance in the direction orthogonal to the long side between adjacent slits is s (mm), an average speed of air blown out from the slit is V (m/s), and a distance from the slit is m (mm), relationships of $d=(b \times m)^{-1/4}$ and $s \leq (b/m)^{-1/2} \times V^{-d}$ are satisfied.

4. The recording device according to claim 1, wherein the plurality of slits are disposed to be inclined at the same angle in the direction intersecting the relative moving direction.

5. The recording device according to claim 4, wherein the plurality of slits are disposed to partially overlap each other in a case of being viewed in the relative moving direction.

6. The recording device according to claim 1, wherein the plurality of slits are disposed such that the long sides thereof are parallel to the direction orthogonal to the relative moving direction, are disposed such that the adjacent slits are mutually shifted in the relative moving direction, and are disposed such that portions that partially overlap each other are formed in a case of being viewed in the relative moving direction.

7. The recording device according to claim 1, wherein the plurality of slits are disposed such that the long sides thereof extend parallel to the relative moving direction and are disposed to overlap each other in a case of being viewed in a direction orthogonal to the relative moving direction.

8. The recording device according to claim 1, wherein the air blowing mechanism has an opposing surface that faces a conveyance region of the liquid-ejected medium in a direction inclined toward a downstream side in the relative moving direction with respect to a direction orthogonal to the relative moving direction, and the plurality of slits are formed in the opposing surface.

9. The recording device according to claim 1, wherein the conveyance portion conveys the liquid-ejected medium to the recording head in the relative moving direction, and the plurality of slits are lined up in a direction intersecting the relative moving direction so as to cover an entire region, in a width direction, of the liquid-ejected medium orthogonal to the relative moving direction.

10. The recording device according to claim 1, wherein the recording head and the air blowing mechanism are moved in a scanning direction intersecting a direction of conveying the liquid-ejected medium by the conveyance portion, and the plurality of slits are lined up in a direction intersecting the scanning direction.

11. The recording device according to claim 1, wherein the liquid-ejected medium is a transfer body, and the recording device further includes a transfer mechanism that transfers an image, formed on the transfer body using a liquid ejected by the recording head, to a recording medium.

12. The recording device according to claim 1, wherein the liquid-ejected medium is a recording medium.

13. The recording device according to claim 1, wherein the air blowing mechanism blows out the air from the air blow-out port while the recording head is ejecting a liquid.

* * * * *